US012666315B2

(12) United States Patent
Kim et al.

(10) Patent No.: US 12,666,315 B2
(45) Date of Patent: Jun. 23, 2026

(54) METHOD AND APPARATUS FOR HANDOVER OF TERMINAL IN WIRELESS COMMUNICATION SYSTEM

(71) Applicant: LG Electronics Inc., Seoul (KR)

(72) Inventors: Seokjung Kim, Seoul (KR); Myungjune Youn, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 18/269,840

(22) PCT Filed: Jan. 14, 2022

(86) PCT No.: PCT/KR2022/000748
§ 371 (c)(1),
(2) Date: Jun. 27, 2023

(87) PCT Pub. No.: WO2022/154584
PCT Pub. Date: Jul. 21, 2022

(65) Prior Publication Data
US 2024/0064580 A1 Feb. 22, 2024

(30) Foreign Application Priority Data
Jan. 15, 2021 (KR) ........................ 10-2021-0006307

(51) Int. Cl.
| | |
|---|---|
| *H04L 5/00* | (2006.01) |
| *H04W 12/06* | (2021.01) |
| *H04W 36/00* | (2009.01) |
| *H04W 36/14* | (2009.01) |
| *H04W 36/30* | (2009.01) |

(52) U.S. Cl.
CPC ....... *H04W 36/0038* (2013.01); *H04W 12/06* (2013.01); *H04W 36/0069* (2018.08); *H04W 36/14* (2013.01); *H04W 36/302* (2023.05)

(58) Field of Classification Search
CPC ............. H04W 36/0038; H04W 12/06; H04W 36/0069; H04W 36/14; H04W 36/302; H04W 48/16; H04W 48/18; H04W 48/20
USPC ....................................................... 455/436
See application file for complete search history.

(56) References Cited

U.S. PATENT DOCUMENTS

2020/0329422 A1 10/2020 Sirotkin et al.

OTHER PUBLICATIONS

3GPP; TSG SA; Study on enhanced support of non-public networks (Release 17). 3GPP TR 23.700-07 VI.2.0 (Nov. 2020). Nov. 27, 2020 (Year: 2020).*
3GPP; TSG RAN; NG-RAN; NG Application Protocol (NGAP) (Release 16). 3GPP TS 38.413 V16.4.0 (Jan. 2021). Jan. 4, 2021 (Year: 2021).*

(Continued)

*Primary Examiner* — Tanmay K Shah
(74) *Attorney, Agent, or Firm* — Fish & Richardson P.C.

(57) ABSTRACT

The present disclosure a method of performing handover of a user equipment (UE) in a wireless communication system, the method comprising: the UE receiving system information including standalone non-public network (SNPN) ID list information; the UE accessing a first node of a source network based on credentials of a home service provider; and performing handover from the first node accessed by the UE to a second node of a target network.

15 Claims, 18 Drawing Sheets

(56) References Cited

OTHER PUBLICATIONS

3GPP; TSG SA; Procedures for the SGS; Stage 2 (Release 16). 3GPP TS 23.502 V16.7.1 (Jan. 2021). Jan. 13, 2021 (Year: 2021).*
3GPP TR 23.700-07 V1.2.0 (Nov. 2020), 3rd Generation Partnership Project; Technical Specification Group Services and System Aspects; Study on enhanced support of non-public networks (Release 17), Nov. 2020, 261 pages.
3GPP TS 23.502 V16.7.1 (Jan. 2021), 3rd Generation Partnership Project; Technical Specification Group Services and System Aspects; Procedures for the 5G System (5GS); Stage 2 (Release 16), Jan. 2021, 605 pages.
3GPP TS 38.413, V16.4.0 (Jan. 2021), 3rd Generation Partnership Project; Technical Specification Group Radio Access Network; NG-RAN; NG Application Protocol (NGAP) (Release 16), Jan. 2021, 472 pages.
Nokia et al., "KI#1, Conclusion," SA WG2 Meeting #141E (e-meeting), S2-2007756, Electronic, Elbonia, Oct. 12-23, 2020, 4 pages.

* cited by examiner

FIG. 3 eNB inter-cell RRM

Figure 3:
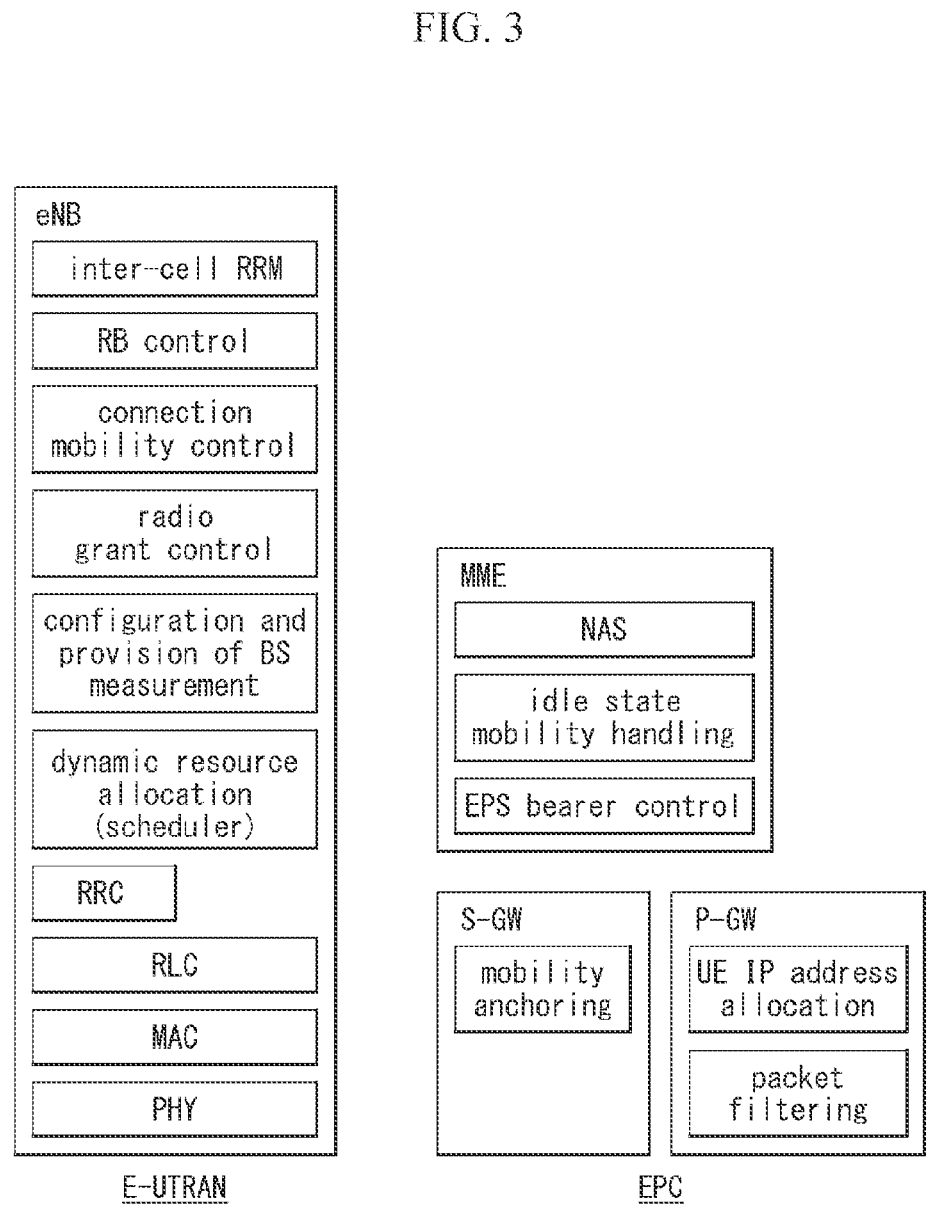

RB control connection
mobility control radio
grant control configuration and
provision of BS
measurement dynamic resource
allocation
(scheduler)

RRC

RLC

MAC

PHY

E-UTRAN

MME

NAS idle state
mobility handling

EPS bearer control

S-GW mobility
anchoring

P-GW

UE IP address
allocation packet
filtering

EPC

SNPN##1

Home SP

METHOD AND APPARATUS FOR HANDOVER OF TERMINAL IN WIRELESS COMMUNICATION SYSTEM

CROSS-REFERENCE TO RELATED APPLICATIONS

This application is a National Stage application under 35 U.S.C. § 371 of International Application No. PCT/KR2022/000748, filed on Jan. 14, 2022, which claims the benefit of Korean Patent Application No. 10-2021-0006307, filed on Jan. 15, 2021. The disclosures of the prior applications are incorporated by reference in their entirety.

FIELD

The following description relates to a wireless communication system and to a handover method of a user equipment (UE). Specifically, the following description relates to a method of handing over a UE to a network having a different standalone non-public network (SNPN) ID.

DESCRIPTION OF THE RELATED ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure may provide a handover method and apparatus of a user equipment (UE) in a wireless communication system.

The present disclosure may provide a method and apparatus for handing over a UE to a network having a different SNPN ID in a wireless communication system.

The present disclosure may provide a handover procedure for supporting a UE being capable of being handed over to a network having a different SNPN ID in a wireless communication system.

The present disclosure may provide allowed SNPN ID list information so that a UE is handed over to a network having a different SNPN ID in a wireless communication system.

The present disclosure may provide SNPN capability information of a UE so that the UE is handed over to a network having a different SNPN ID in a wireless communication system.

The technical objects to be achieved in the present disclosure are not limited to the above-mentioned technical objects, and other technical objects that are not mentioned may be considered by those skilled in the art through the embodiments described below.

The present disclosure a method of performing handover of a user equipment (UE) in a wireless communication system, the method comprising: the UE receiving system information including standalone non-public network (SNPN) ID list information; the UE accessing a first node of a source network based on credentials of a home service provider; and performing handover from the first node accessed by the UE to a second node of a target network.

The present disclosure a user equipment (UE) operating in a wireless communication system, the UE comprising: at least one transceiver; at least one processor; and at least one memory operably connected to the at least one processor and configured to store instructions which, when executed, cause the at least one processor to perform a specific operation, wherein the specific operation controls the at least one transceiver to: receive system information including standalone non-public network (SNPN) ID list information; access a first node of a source network based on credentials of a home service provider; and perform handover from the first node accessed by the UE to a second node of a target network.

The present disclosure a method of performing handover of a user equipment (UE) in a wireless communication system, the method comprising: a first node transmitting system information including standalone non-public network (SNPN) ID list information to the UE; connecting to the UE based on credentials of a home service provider of the UE; and handing over the UE to a second node of a target network.

The present disclosure a first node operating in a wireless communication system, the first node comprising: at least one transceiver; at least one processor; and at least one memory operably connected to the at least one processor and configured to store instructions which, when executed, cause the at least one processor to perform a specific operation, wherein the specific operation controls the at least one transceiver to: transmit system information including standalone non-public network (SNPN) ID list information to the UE; connect to the UE based on credentials of a home service provider of the UE; and hand over the UE to a second node of a target network.

The present disclosure an apparatus comprising at least one memory and at least one processor functionally connected to the at least one memory, wherein the at least one processor controls the apparatus to: receive system information including standalone non-public network (SNPN) ID list information; access a first node of a source network based on credentials of a home service provider; and perform handover from the first node accessed by the apparatus to a second node of a target network.

The present disclosure a non-transitory computer-readable medium storing at least one instruction, the non-transitory computer-readable medium comprising the at least one instruction executable by a processor, wherein the at least one instruction performs control to: receive system information including standalone non-public network (SNPN) ID list information; access a first node of a source network based on credentials of a home service provider; and perform handover from the first node accessed by an apparatus to a second node of a target network.

In addition, the following items can be applied in common.

The present disclosure the system information comprises information indicating that the UE is capable of accessing the first node of the source network through the credentials of the home service provider.

The present disclosure, based on the UE accessing the first node, the UE transmits, to the first node, a radio resource control (RRC) message for registration with the first node, and the RRC message comprises at least one of SNPN ID information of the source network selected by the UE or SNPN access capability information.

The present disclosure the first node selects a first access and mobility management function (AMF) based on the SNPN ID in the RRC message and transmits an initial UE message including the SNPN ID, and receives an initial context setup request message from the first AMF based on the first AMF allowing registration of the UE.

The present disclosure the initial contest setup request message comprises information on a list of allowed SNPNs to which the UE is capable of being handed over.

The present disclosure candidate nodes to which the UE is capable of being handed over are set to other nodes in the source network and nodes having SNPN IDs of SNPNs included in the allowed SNPN list, and wherein the UE is handed over to any one of the candidate nodes.

The present disclosure the UE determines the target network based on information pre-configured through the first node and the allowed SNPN list information and is handed over to the target node in the target network.

The present disclosure the UE is handed over to the target node in the target network based on any one of Xn-based handover or NG-based handover.

The present disclosure, based on the UE being handed over to the target node in the target network through the Xn-based handover and the target node in the target network accepting handover the UE, the target node in the target network provides updated serving SNPN ID information to the UE through the first node.

The present disclosure, based on the UE being handed over to the target node in the target network through the NG-based handover, the first AMF transmits a handover required message to a second AMF corresponding to the target node of the target network, wherein the second AMF transmits a handover request message to the target node of the target network, receives a response, obtains updated serving SNPN ID information, and sends the updated serving SNPN ID to the first node through the first AMF, and wherein the UE receives a handover command message including the updated serving SNPN ID from the first node.

The present disclosure the initial contest setup request message comprises information indicating SNPN capability of the UE.

The present disclosure the UE is handed over from the first node to an arbitrary target node, based on the UE being handed over from the first node to another node based on a measurement result, and wherein the first node transmits a handover required message to the first AMF, based on the handover of the UE being necessary based on the measurement result.

The present disclosure the handover required message comprises SNPN ID information of the target network including the target node, wherein the first AMF transmits a handover request message to a second AMF of the target network based on the SNPN ID of the target network, and wherein the second AMF checks whether the UE is capable of accessing the target network through the credentials of the home service provider.

The present disclosure, based on the UE being capable of accessing the target network through the credentials of the home service provider, the second AMF transmits a handover request message including SNPN capability information of the UE to the target node of the target network, receives a response and obtains updated serving SNPN ID information, and wherein the updated serving SNPN ID is sent to the first node through the first AMF.

The present disclosure the UE receives a handover command message including the updated serving SNPN ID from the first node.

The present disclosure, based on the UE being capable of accessing the source network and the target network through the credentials of the home service provider and AMFs of the source network and the target network being the same or an N14 interface being present between the source network and the target network, the UE is handed over to the target network having a SNPN ID different from that of the source network.

The above-described aspects of the present disclosure are only some of the preferred embodiments of the present disclosure, and various embodiments in which the technical features of the present disclosure are reflected are the detailed descriptions of the present disclosure to be detailed below by those of ordinary skill in the art.

The present disclosure may provide a handover method and apparatus of a UE in a wireless communication system.

The present disclosure may provide a method and apparatus for handing over a UE to a network having a different SNPN ID in a wireless communication system.

The present disclosure may provide a handover procedure for supporting a UE being capable of being handed over to a network having a different SNPN ID in a wireless communication system.

The present disclosure may efficiently perform handover, by providing allowed SNPN ID list information so that a UE is capable of being handed over to a network having a different SNPN ID in a wireless communication system.

The present disclosure may efficiently perform handover, by providing SNPN capability information of a UE so that a UE is capable of being handed over to a network having a different SNPN ID in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

DESCRIPTION OF DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 3 is a view illustrating a general E-URTAN and an example of an architecture of an evolved packet core (EPC).

FIG. 9 is a view illustrating an example of a wireless device applicable to the present disclosure.

FIG. 10 is a view illustrating a mobility scenario by a user equipment (UE) applicable to the present disclosure.

FIG. 12 is a view illustrating a mobility scenario by a user equipment (UE) applicable to the present disclosure.

FIG. 14 is a view illustrating a mobility scenario by a user equipment (UE) applicable to the present disclosure.

FIG. 15 is a view illustrating a mobility scenario by a user equipment (UE) applicable to the present disclosure.

FIG. 16 is a view illustrating procedures for handover applicable to the present disclosure.

DETAILED DESCRIPTION

Figure 1:
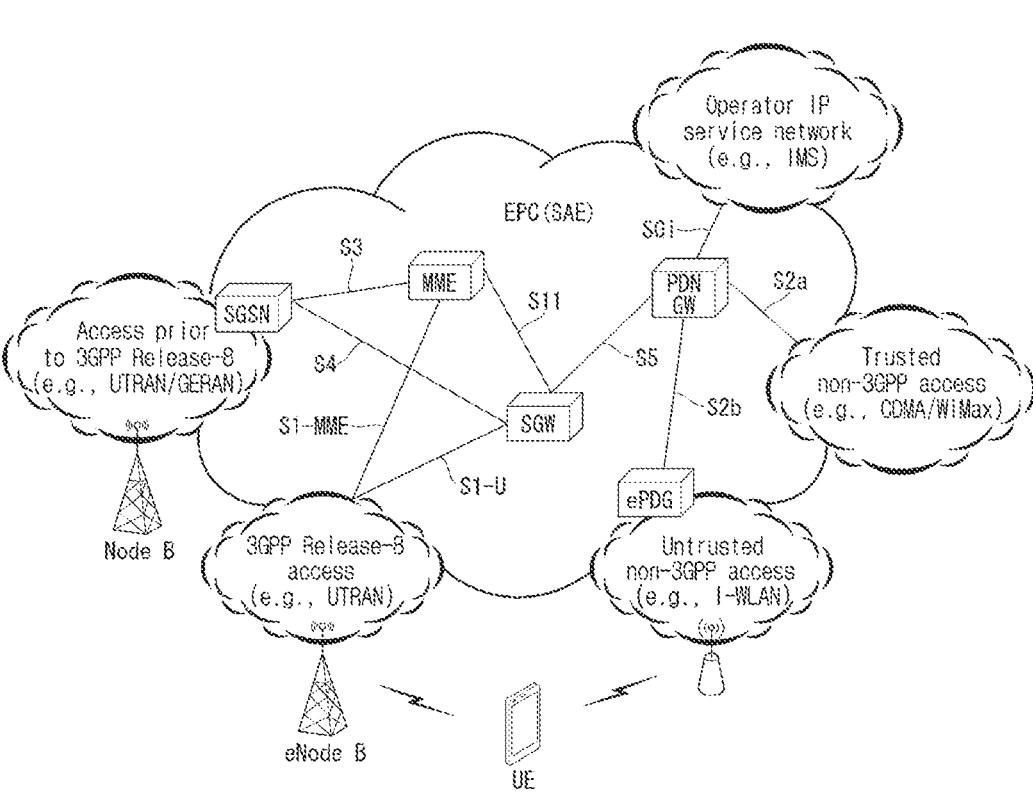
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B (eNB)", "gNode B (gNB)", "ng-eNB", "advanced base station (ABS)", or "access point".

Also, in the embodiments of the present disclosure, "terminal" may be replaced by such terms as "user equipment (UE)", "mobile station (MS)", "subscriber station (SS)", "mobile subscriber station (MSS)", "mobile terminal" or "advanced mobile station (AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx" means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

For terms, abbreviations, and other backgrounds that may be used in this document, reference may be made to the following standard document descriptions published prior to this document. In particular, terms, abbreviations, and other background technologies related to LTE/EPS (Evolved Packet System) may refer to 36.xxx series, 23.xxx series, and 24.xxx series, and NR (new radio)/5GS related terms and abbreviations and other backgrounds may refer to the 38.xxx series, 23.xxx series and 24.xxx series.

3GPP LTE/EPS

3GPP TS 36.211: Physical channels and modulation

3GPP TS 36.212: Multiplexing and channel coding

3GPP TS 36.213: Physical layer procedures

3GPP TS 36.214: Physical layer; Measurements

3GPP TS 36.300: Overall description

3GPP TS 36.304: User Equipment (UE) procedures in idle mode

3GPP TS 36.306: User Equipment (UE) radio access capabilities

3GPP TS 36.314: Layer 2—Measurements

3GPP TS 36.321: Medium Access Control (MAC) protocol

3GPP TS 36.322: Radio Link Control (RLC) protocol

3GPP TS 36.323: Packet Data Convergence Protocol (PDCP)

3GPP TS 36.331: Radio Resource Control (RRC) protocol

3GPP TS 36.413: S1 Application Protocol (S1AP)

3GPP TS 36.423: X2 Application Protocol (X2AP)

3GPPP TS 22.125: Unmanned Aerial System support in 3GPP; Stage 1

3GPP TS 23.303: Proximity-based services (Prose); Stage 2

3GPP TS 23.401: General Packet Radio Service (GPRS) enhancements for Evolved Universal Terrestrial Radio Access Network (E-UTRAN) access 3GPP TS 23.402: Architecture enhancements for non-3GPP accesses 3GPP TS 23.286: Application layer support for V2X services; Functional architecture and information flows 3GPP TS 24.301: Non-Access-Stratum (NAS) protocol for Evolved Packet System (EPS); Stage 3

3GPP TS 24.302: Access to the 3GPP Evolved Packet Core (EPC) via non-3GPP access networks; Stage 3

3GPP TS 24.334: Proximity-services (ProSe) User Equipment (UE) to ProSe function protocol aspects; Stage 3

3GPP TS 24.386: User Equipment (UE) to V2X control function; protocol aspects; Stage 3

3GPP NR/5GS

3GPP TS 38.211: Physical channels and modulation

3GPP TS 38.212: Multiplexing and channel coding

3GPP TS 38.213: Physical layer procedures for control

3GPP TS 38.214: Physical layer procedures for data

3GPP TS 38.215: Physical layer measurements

3GPP TS 38.300: NR and NG-RAN Overall Description

3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

3GPP TS 37.324: Service Data Adaptation Protocol (SDAP)

3GPP TS 37.340: Multi-connectivity; Overall description

3GPP TS 23.501: System Architecture for the 5G System

3GPP TS 23.502: Procedures for the 5G System

3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (SGCN) via non-3GPP access networks 3GPP TS 24.526: User Equipment (UE) policies for 5G System (5GS); Stage 3

3GPP V2X

3GPP TS 23.285: Architecture enhancements for V2X services

3GPP TR 23.786: Evolved Packet System (EPS) and the 5G System (5GS) to support advanced V2X services 3GPP TS 23.287: Architecture enhancements for 5G System (5GS) to support Vehicle-to-Everything (V2X) services 3GPP TS 24.587: Vehicle-to-Everything (V2X) services in 5G System (5GS); Protocol aspects; Stage 3

3GPP TS 24.588: Vehicle-to-Everything (V2X) services in 5G System (5GS); User Equipment (UE) policies; Stage 3

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

An example of the network structure of FIG. 1 discloses an LTE/EPS-based network structure, and may operate with reference to matters described in standard documents published before this document. In the network structure of FIG. 1, at least one of SGW, PDN GW, MME, SGSN, and ePDG entities may operate with reference to matters described in standard documents published before this document. In addition, S1-MME, S1-U, S2a, S2b, S3, S4, S5, S11, and SGi may exist as interfaces between each entity, which are described in the standard document published before this document. can do. In addition, other entities and interfaces may be configured with reference to matters described in standard documents published before this document described above, and are not limited to specific forms.

Figure 2:
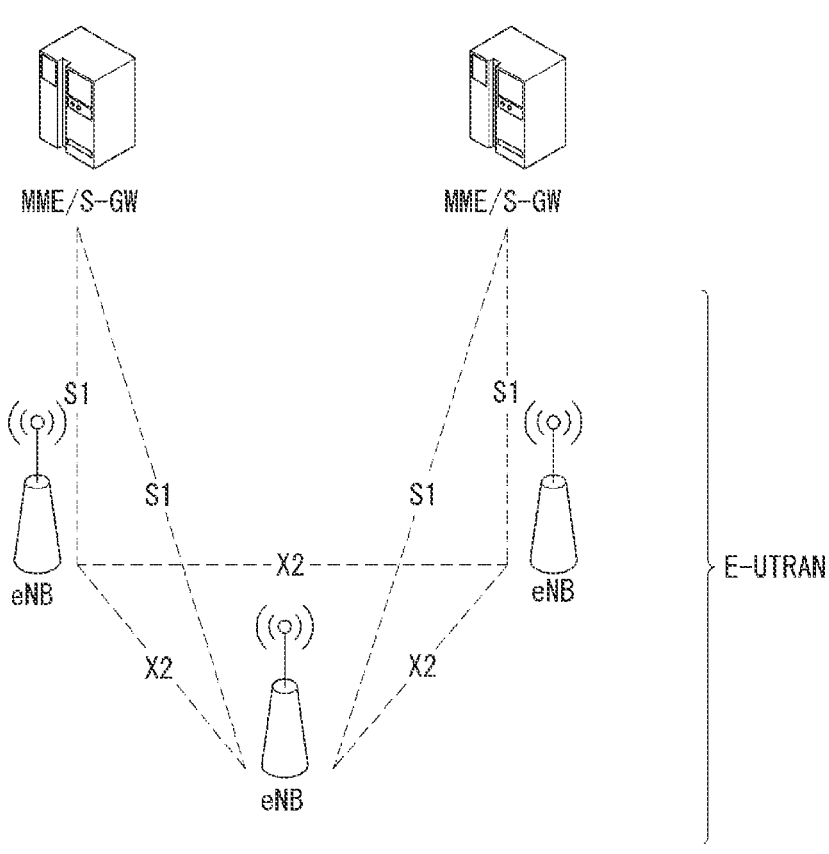
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface, and reference may be made to matters described in standard documents published before this document.

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures combining 5G and 4G. And 3GPP TS 23.501 shows an architecture using NR and NGC.

Figure 4:
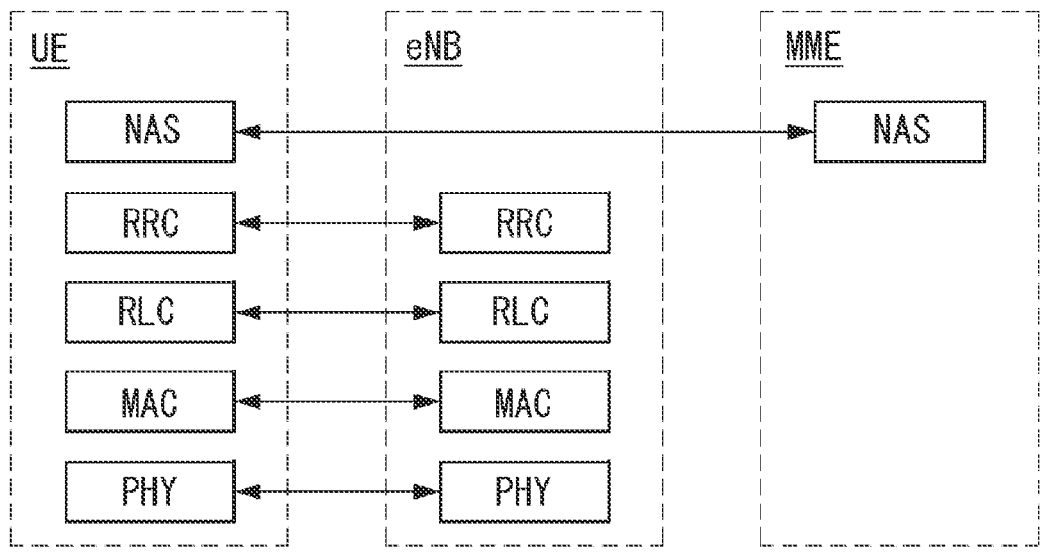
FIG. 4 is a view illustrating an example of a structure of a radio interface protocol in a control plane between user equipment (UE) and evolved node B (eNB).
Figure 5:
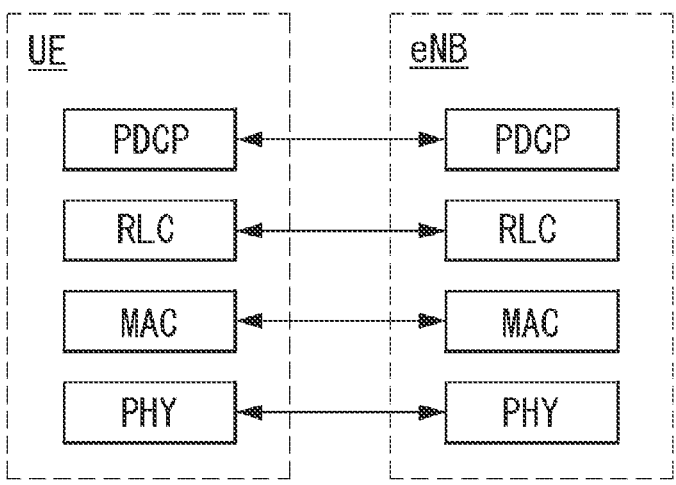
FIG. 5 is a view illustrating an example of a structure of a radio interface protocol in a user plane between UE and eNB.
Figure 5:
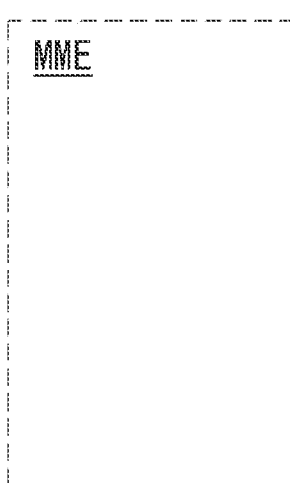

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems, and it is possible to refer to the matters described in the standard document published before this document described above.

Figure 6:
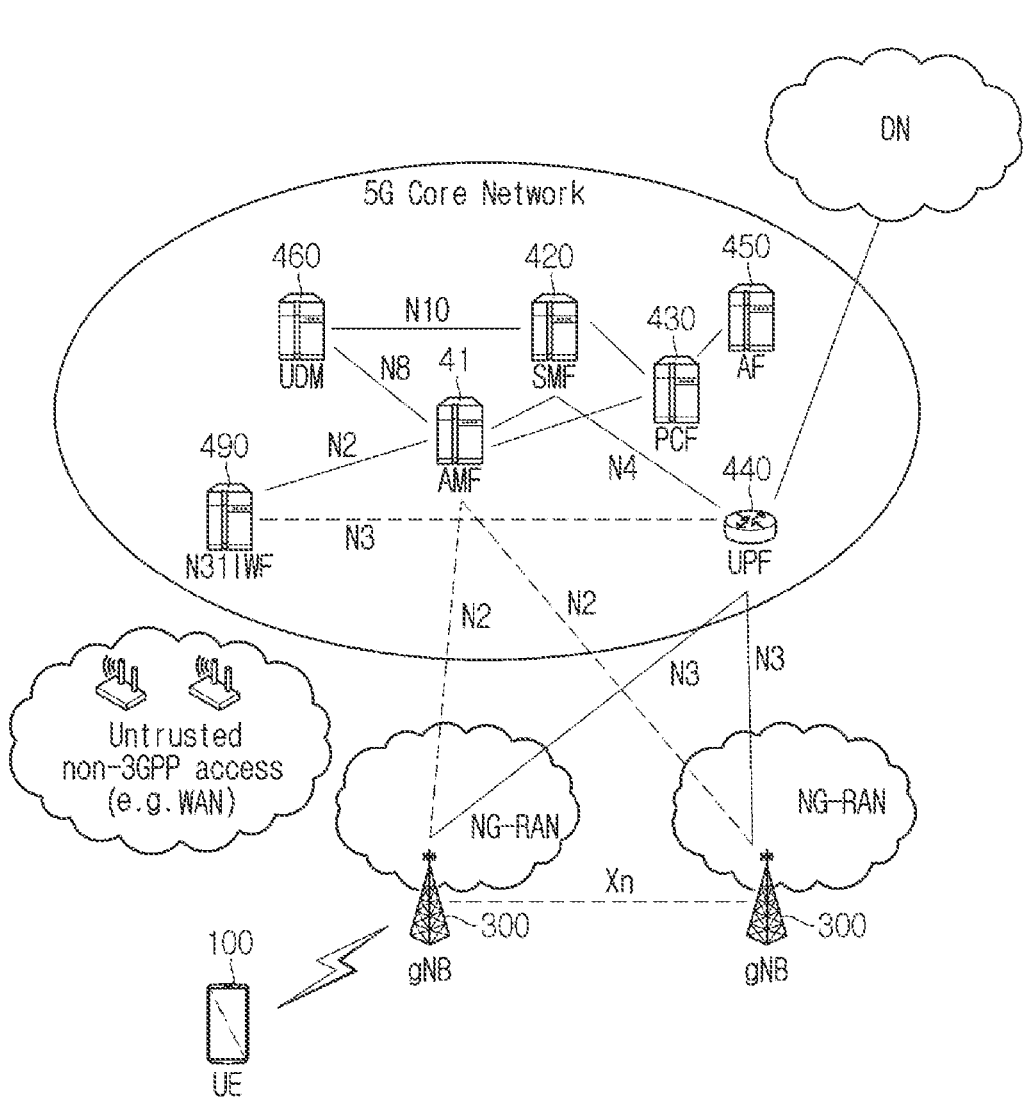
FIG. 6 is a view illustrating an example of an architecture of a general new radio (NR)-radio access network (RAN).

FIG. 6 is a view illustrating an example of a wireless communication system that is applied to the present disclosure.

5GC (5G Core) may include various components, part of which are shown in FIG. 6, including an access and mobility management function (AMF) 410, a session management function (SMF) 420, a policy control function (PCF) 430, a Prose user plane function (UPF) 440, an application function (AF) 450, unified data management (UDM) 460, and a non-3GPP interworking function (N3IWF) 490.

A UE 100 is connected to a data network via the UPF 440 through a next generation radio access network (NG-RAN) including the gNB 300. The UE 100 may be provided with a data service even through untrusted non-3GPP access, e.g., a wireless local area network (WLAN). In order to connect the non-3GPP access to a core network, the N3IWF 490 may be deployed.

The N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The AMF 410 may manage access and mobility in the 5G system. The AMF 410 may perform a function of managing (non-access stratum) NAS security. The AMF 410 may perform a function of handling mobility in an idle state.

The UPF 440 performs a function of gateway for transmitting and receiving user data. The UPF node 440 may perform the entirety or a portion of a user plane function of a serving gateway (S-GW) and a packet data network gateway (P-GW) of 4G mobile communication.

The UPF 440 is a component that operates as a boundary point between a next generation radio access network (NG-RAN) and the core network and maintains a data path between the gNB 300 and the SMF 420. In addition, when the UE 100 moves over an area served by the gNB 300, the UPF 440 serves as a mobility anchor point. The UPF 440 may perform a function of handling a PDU. For mobility within the NG-RAN (which is defined after 3GPP Release-15), the UPF 440 may route packets. In addition, the UPF 440 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The PCF 430 is a node that controls an operator's policy. The AF 450 is a server for providing various services to the UE 100. The UDM 460 is a server that manages subscriber information, such as home subscriber server (HSS) of 4G mobile communication. The UDM 460 stores and manages the subscriber information in a unified data repository (UDR).

The SMF 420 may perform a function of allocating an Internet protocol (IP) address of the UE 100. In addition, the SMF 420 may control a packet data unit (PDU) session.

For convenience of explanation, hereinafter, reference numerals may be omitted for AMF 410, SMF 420, PCF 430, UPF 440, AF 450, UDM 460, N3IWF 490, gNB 300, or UE 100, which may operate with reference to contents described in standard documents released earlier than the present document.

Figure 7:
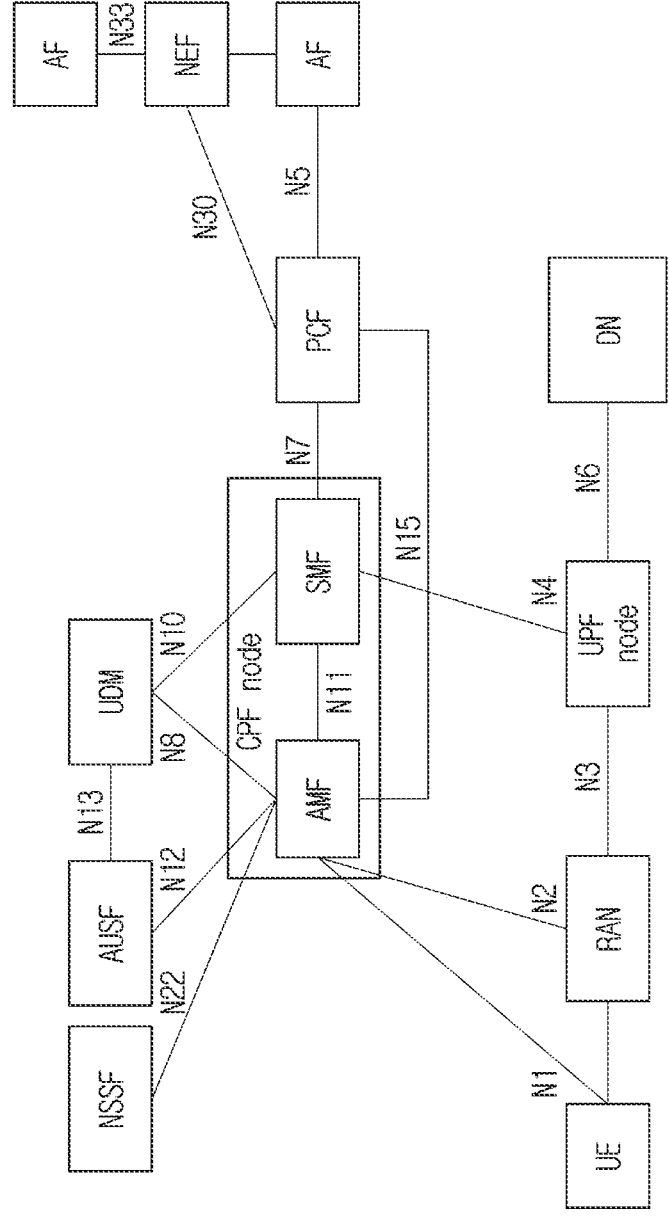
FIG. 7 is a view illustrating an example of functional separation of a general NG-RAN and a 5th generation core (5GC).

FIG. 7 is a view illustrating an example expressing a structure of a wireless communication system, which is applied to the present disclosure, from a node perspective.

Referring to FIG. 7, a UE is connected to a data network (DN) through a next generation RAN. A control plane function (CPF) node performs all or a part of the functions of a mobility management entity (MME) of 4G mobile communication and all or a part of serving gateway (S-GW) and PDN gateway (P-GW) functions. The CPF node includes AMF and SMF.

A UPF node performs a function of a gateway in which data of a user is transmitted and received.

An authentication server function (AUSF) authenticates and manages a UE. A network slice selection function (NSSF) is a node for network slicing described below.

A network exposure function (NEF) provides a mechanism that safely opens the service and function of 5G core.

Reference points in FIG. 7 are described as follows. N1 represents a reference point between UE and AMF. N2 represents a reference point between (R)AN and AMF. N3 represents a reference point between (R)AN and UPF. N4 represents a reference point between SMF and UPF. N5 represents a reference point between PCF and AF. N6 represents a reference point between UPF and DN. N7 represents a reference point between SMF and PCF. N8 represents a reference point between UDM and AMF. N9 represents a reference point between UPFs. N10 represents a reference point between UDM and SMF. N11 represents a reference point between AMF and SMF. N12 represents a reference point between AMF and AUSF. N13 represents a reference point between UDM and AUSF. N14 represents a reference point between AMFs. N15 represents a reference point between PCF and AMF in a non-roaming scenario and a reference point between AMF and PCF of a visited network in a roaming scenario. N16 represents a reference point between SMFs. N22 represents a reference point between AMF and NSSF. N30 represents a reference point between PCF and NEF. N33 may represent a reference point between AF and NEF, and the above-described entity and interface may be configured with reference to contents described in standard documents released earlier than the present document.

A radio interface protocol is based on the 3GPP radio access network standard. The radio interface protocol is horizontally divided into a physical layer, a data link layer, and a network layer, and is vertically divided into a user plane for transmission of data information and a control plane for transfer of control signal (signaling).

The protocol layers may be divided into L1 (layer-1), L2 (layer-2), and L3 (layer-3) based on the three lower layers of the open system interconnection (OSI) reference model widely known in communication systems.

Figure 8:
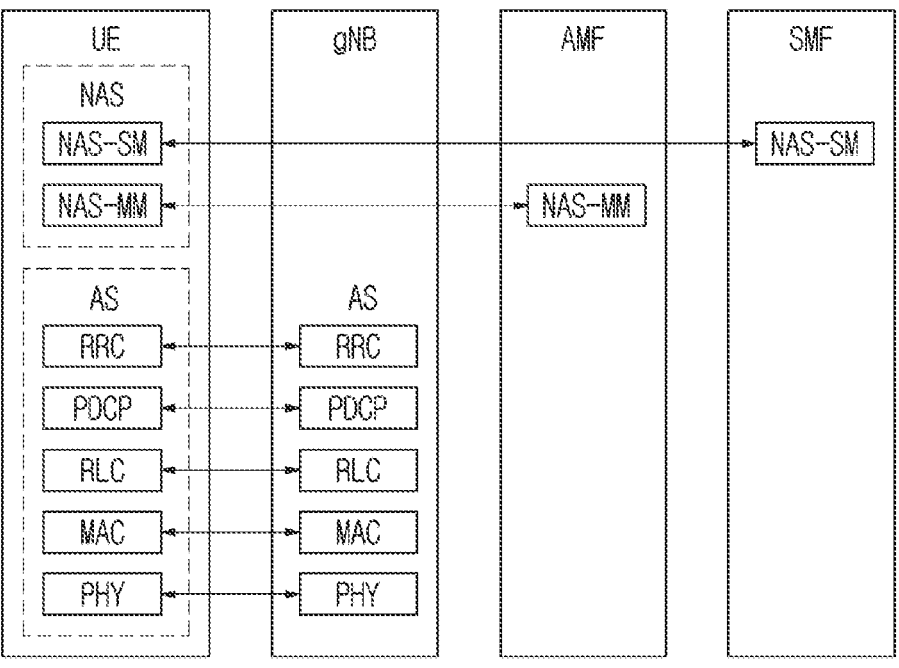
FIG. 8 is a view illustrating an example of a general architecture of a 5th generation (5G) system.

Hereinafter, the present disclosure will describe each layer of a radio protocol. FIG. 8 is a view illustrating an example of a radio interface protocol between UE and gBN.

Referring to FIG. 8, an access stratum (AS) layer may include a physical (PHY) layer, a medium access control layer, a radio link control (RLC) layer, a packet data convergence protocol (PDCP) layer, and a radio resource control (RRC) layer, and an operation based on each layer may be performed with reference to contents described standard documents released earlier than the present document.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

Figure 9:
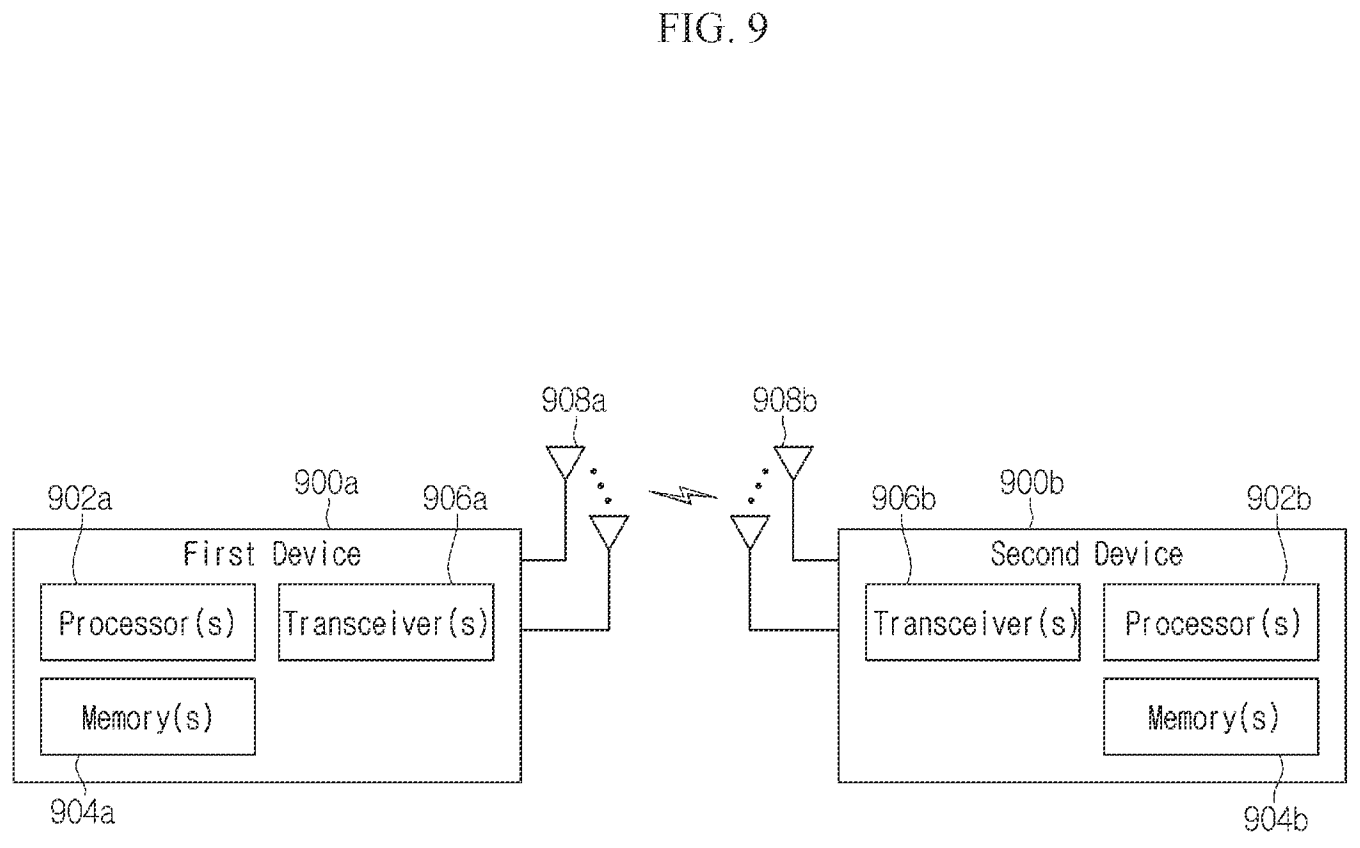

FIG. 9 is a view showing an example of a wireless device applicable to the present disclosure.

Referring to FIG. 9, a first wireless device 900a and a second wireless device 900b may transmit and receive radio signals through various radio access technologies (e.g., LTE or NR). Here, {the first wireless device 900a, the second wireless device 900b} may correspond to {the wireless device 100x, the base station 90} and/or {the wireless device 100x, the wireless device 100x}.

The first wireless device 900a may include one or more processors 902a and one or more memories 904a and may further include one or more transceivers 906a and/or one or more antennas 908a. The processor 902a may be configured to control the memory 904a and/or the transceiver 906a and to implement descriptions, functions, procedures, proposals, methods and/or operational flowcharts disclosed herein. For example, the processor 902a may process information in the memory 904a to generate first information/signal and then transmit a radio signal including the first information/signal through the transceiver 906a. In addition, the processor 902a may receive a radio signal including second information/signal through the transceiver 906a and then store information obtained from signal processing of the second information/signal in the memory 904a. The memory 904a may be coupled with the processor 902a, and store a variety of information related to operation of the processor 902a. For example, the memory 904a may store software code including instructions for performing all or some of the processes controlled by the processor 902a or performing the descriptions, functions, procedures, proposals, methods and/or operational flowcharts disclosed herein. Here, the processor 902a and the memory 904a may be part of a communication modem/circuit/chip designed to implement wireless communication technology (e.g., LTE or NR). The transceiver 906*a* may be coupled with the processor 902*a* to transmit and/or receive radio signals through one or more antennas 908*a*. The transceiver 906*a* may include a transmitter and/or a receiver. The transceiver 906*a* may be used interchangeably with a radio frequency (RF) unit. In the present disclosure, the wireless device may refer to a communication modem/circuit/chip.

The second wireless device 900*b* may include one or more processors 902*b* and one or more memories 904*b* and may further include one or more transceivers 906*b* and/or one or more antennas 908*b*. The processor 902*b* may be configured to control the memory 904*b* and/or the transceiver 906*b* and to implement the descriptions, functions, procedures, proposals, methods and/or operational flowcharts disclosed herein. For example, the processor 902*b* may process information in the memory 904*b* to generate third information/signal and then transmit the third information/signal through the transceiver 906*b*. In addition, the processor 902*b* may receive a radio signal including fourth information/signal through the transceiver 906*b* and then store information obtained from signal processing of the fourth information/signal in the memory 904*b*. The memory 904*b* may be coupled with the processor 902*b* to store a variety of information related to operation of the processor 902*b*. For example, the memory 904*b* may store software code including instructions for performing all or some of the processes controlled by the processor 902*b* or performing the descriptions, functions, procedures, proposals, methods and/or operational flowcharts disclosed herein. Herein, the processor 902*b* and the memory 904*b* may be part of a communication modem/circuit/chip designed to implement wireless communication technology (e.g., LTE or NR). The transceiver 906*b* may be coupled with the processor 902*b* to transmit and/or receive radio signals through one or more antennas 908*b*. The transceiver 906*b* may include a transmitter and/or a receiver. The transceiver 906*b* may be used interchangeably with a radio frequency (RF) unit. In the present disclosure, the wireless device may refer to a communication modem/circuit/chip.

In addition, the structure of a wireless device applicable to the present disclosure is not limited to FIG. 9, and may be configured in various forms. In particular, the present disclosure may be applied to a wireless device that performs an operation for transmitting and/or receiving a wireless signal, and is not limited to a specific form.

For example, FIGS. 10 to 15 are views illustrating mobility scenarios by a user equipment (UE). More specifically, an interworking option which may be supported between two networks among a source network, a target network and a home service provider may be no interworking support, roaming-like interworking or N3IWF based interworking. That is, interworking may not be supported or roaming-like interworking or N3IWF based interworking may be supported between two networks. However, for example, in FIGS. 10 to 15, an Xn interface or N14 interface may not be present between the source network and the target network based on a common AMF. That is, as the case where the Xn interface or N14 interface may not be present between the source network and the target network based on the common AMF, there may be a scenario in which a UE moves from the source network to the target network based on the above-described interworking.

Figure 10:
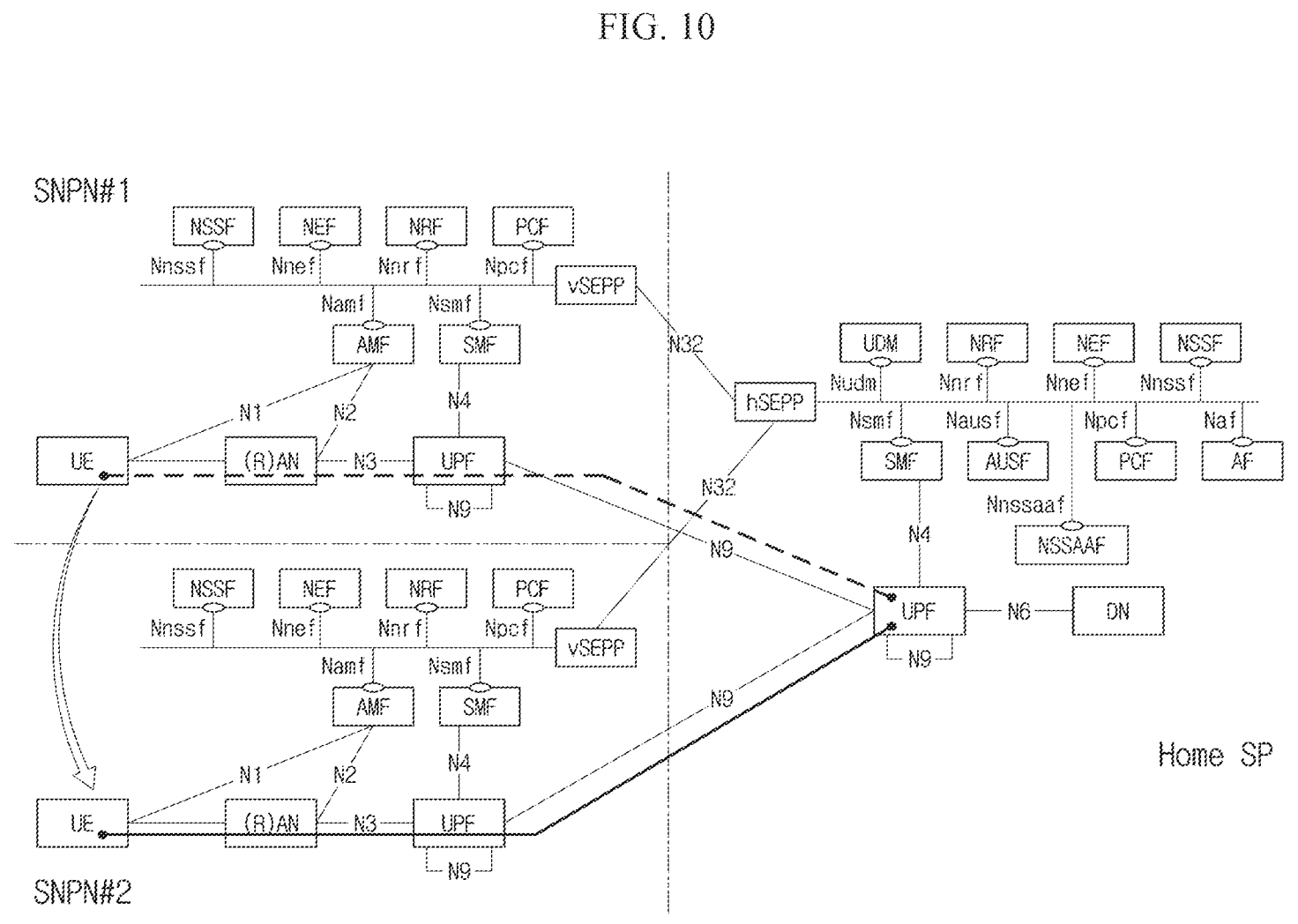

As a specific example, FIG. 10 may illustrate a scenario in which a UE having a PDU session anchored to a home service provider moves from standalone non-public network (SNPN) #1 as a source network to SNPN #2 as a target network. For example, in FIG. 10, roaming-like interworking may be supported between the home service provider and SNPN #2. In addition, for example, FIG. 11 may illustrate a scenario in which a UE having a PDU session anchored to a home service provider moves from SNPN #1 as a source network to SNPN #2 as a target network. For example, in FIG. 11, N3IWF based interworking may be supported between the home service provider and SNPN #2.

Figure 12:
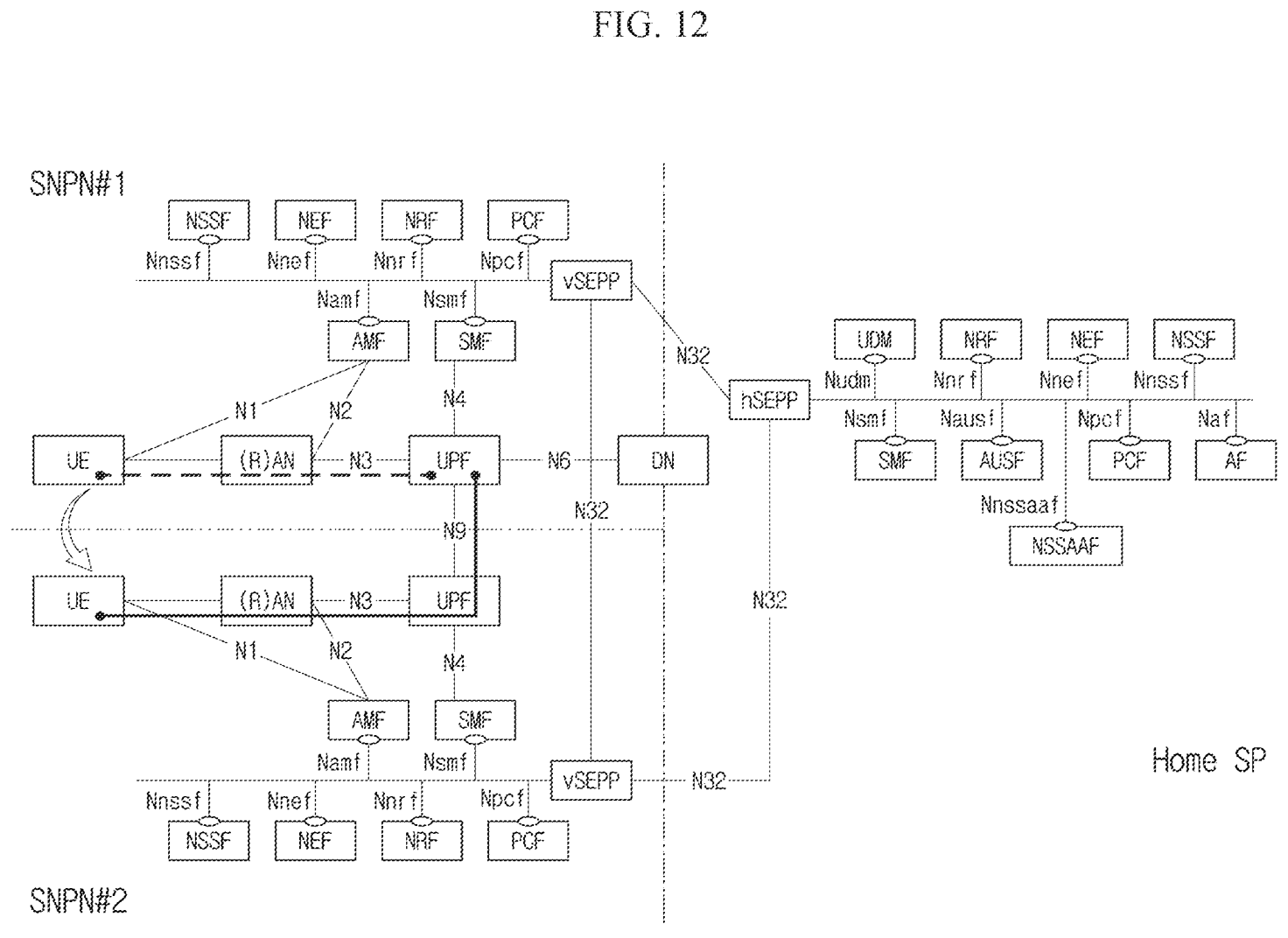

In addition, FIG. 12 may illustrate a scenario in which a UE having a PDU session anchored to SNPN #1 moves from SNPN #1 as a source network to SNPN #2 as a target network. For example, in FIG. 12, roaming-like interworking may be supported between the SNPN #1 and SNPN #2. In addition, for example, FIG. 13 may illustrate a scenario in which a UE having a PDU session anchored to SNPN #1 moves from SNPN #1 as a source network to SNPN #2 as a target network. For example, in FIG. 13, N3IWF based interworking may be supported between SNPN #1 and SNPN #2.

Figure 14:
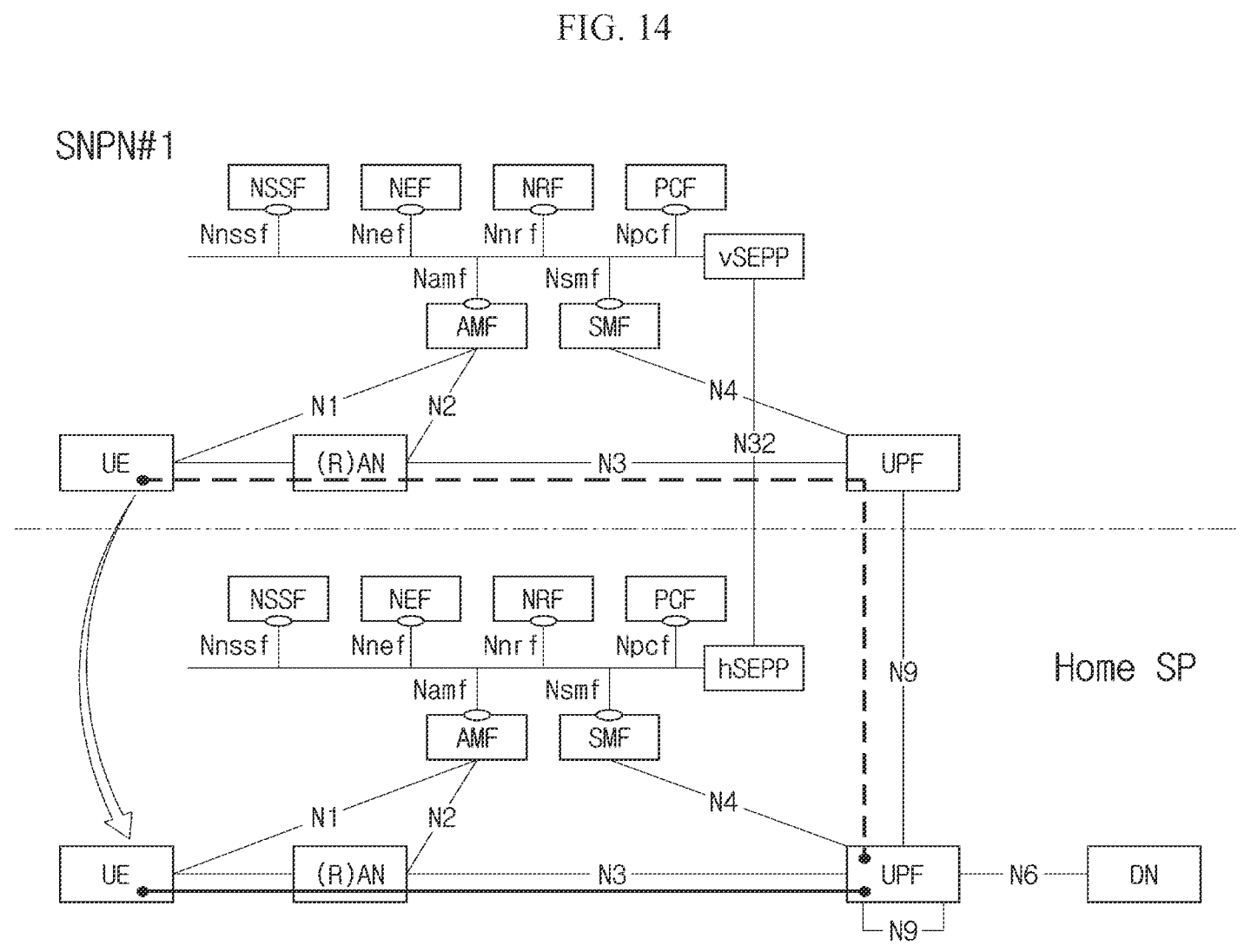

In addition, for example, FIG. 14 may illustrate a scenario in which a UE having a PDU session anchored to a home service provider moves from SNPN #1 as a source network to a home service provider as a target network. In addition, for example, FIG. 15 may illustrate a scenario in which a UE having a PDU session anchored SNPN #1 moves from SNPN #1 as a source network to a home service provider as a target network.

At this time, in FIGS. 10 to 15, no interworking support, roaming-like interworking or N3IWF based interworking may be supported between SNPN #1 and SNPN #2. Here, when the UE attempts connection with SNPN #2 through credentials of the home service provider, SNPN #2 may reject connection of the UE when SNPN #2 is not present in an allowed SNPN list in subscription information of the home service provider. At this time, the allowed SNPN list may be used as a criterion for triggering a handover procedure from the source network to the target SNPN.

Figure 11:
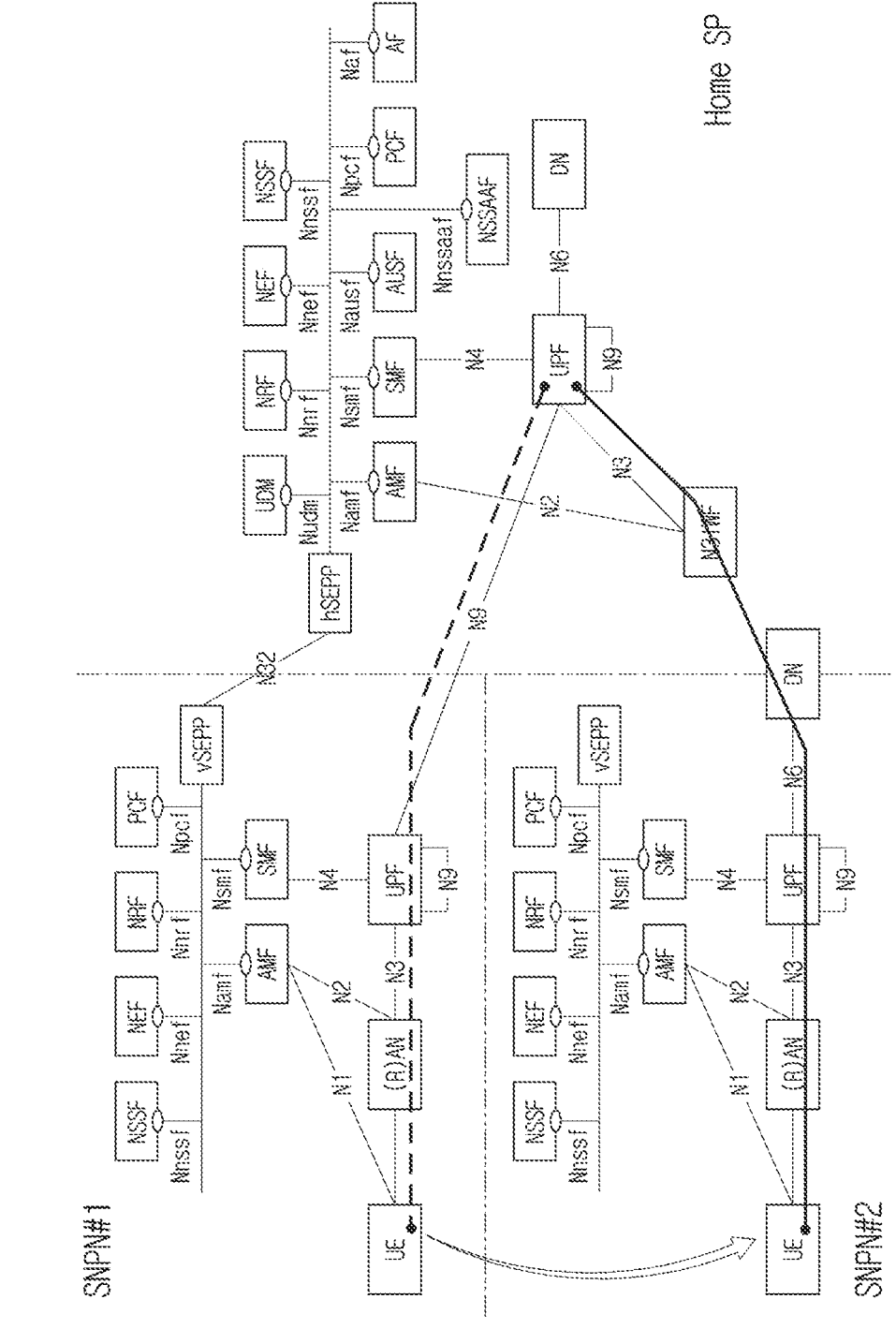
FIG. 11 is a view illustrating a mobility scenario by a user equipment (UE) applicable to the present disclosure.

For example, in the case of FIGS. 10, 11, and 14 described above, the PDU session may be anchored to the home service provider. At this time, the target network may provide mobility indication information to the UE. For example, the mobility indication may be an indication to perform handover for the PDU session anchored to the home service provider in a process in which the UE performs registration with a target network. In this case, the mobility indication may be performed for each PDU session and may be generated in the AMF based on interworking between the target network and the home service provider. For example, in the case of roaming-like interworking, the mobility indication may be set to "1". In addition, in the case of N3IWF based interworking, the mobility indication may be set to "2". On the other hand, in the case of no interworking support, the mobility indication may be set to "3", but may not be limited thereto. At this time, the UE may perform handover for the PDU session anchored to the home service provider after receiving the mobility indication. At this time, the UE may perform a PDU session establishment procedure based on the indicated interworking.

Figure 13:
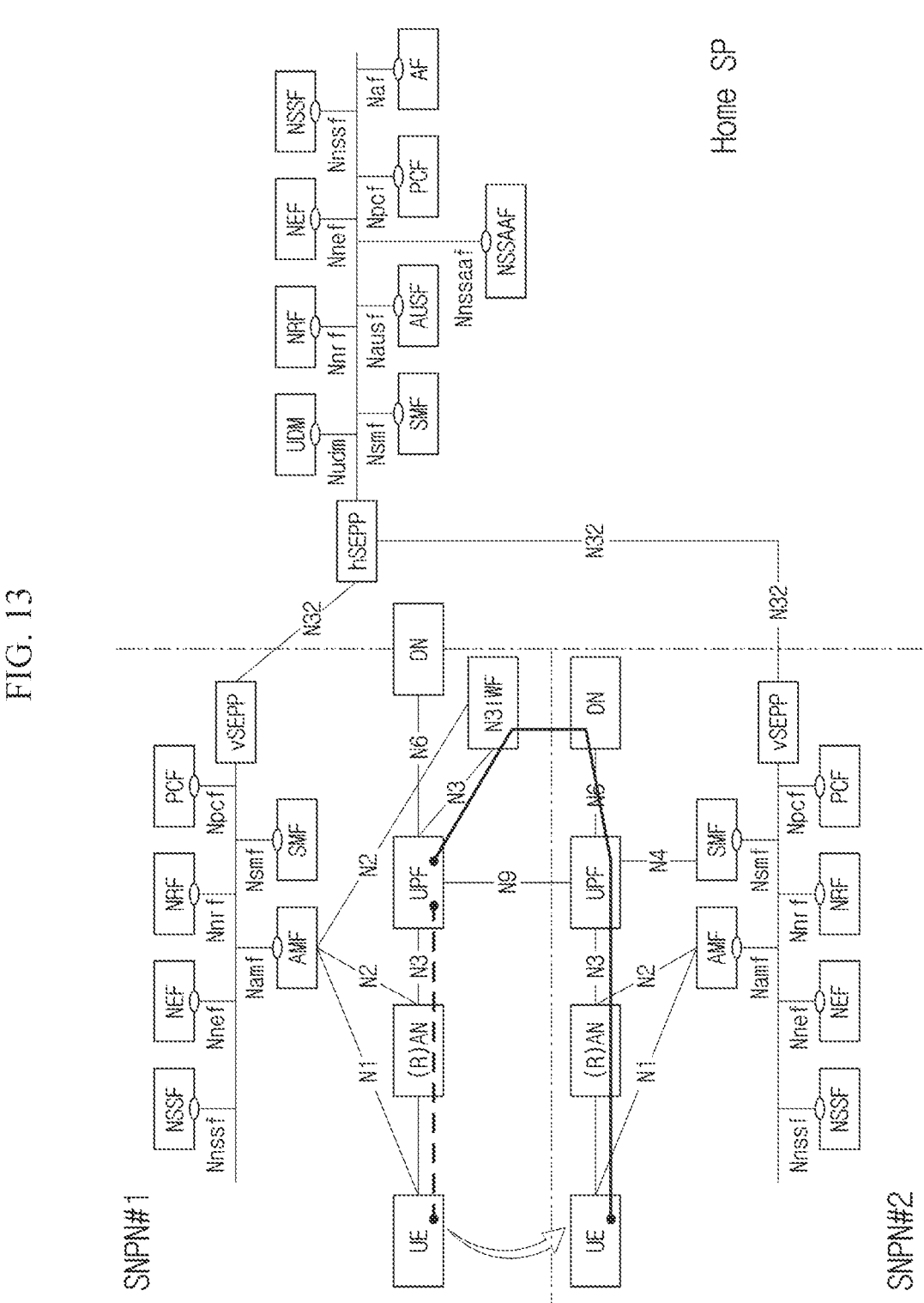
FIG. 13 is a view illustrating a mobility scenario by a user equipment (UE) applicable to the present disclosure.
Figure 15:
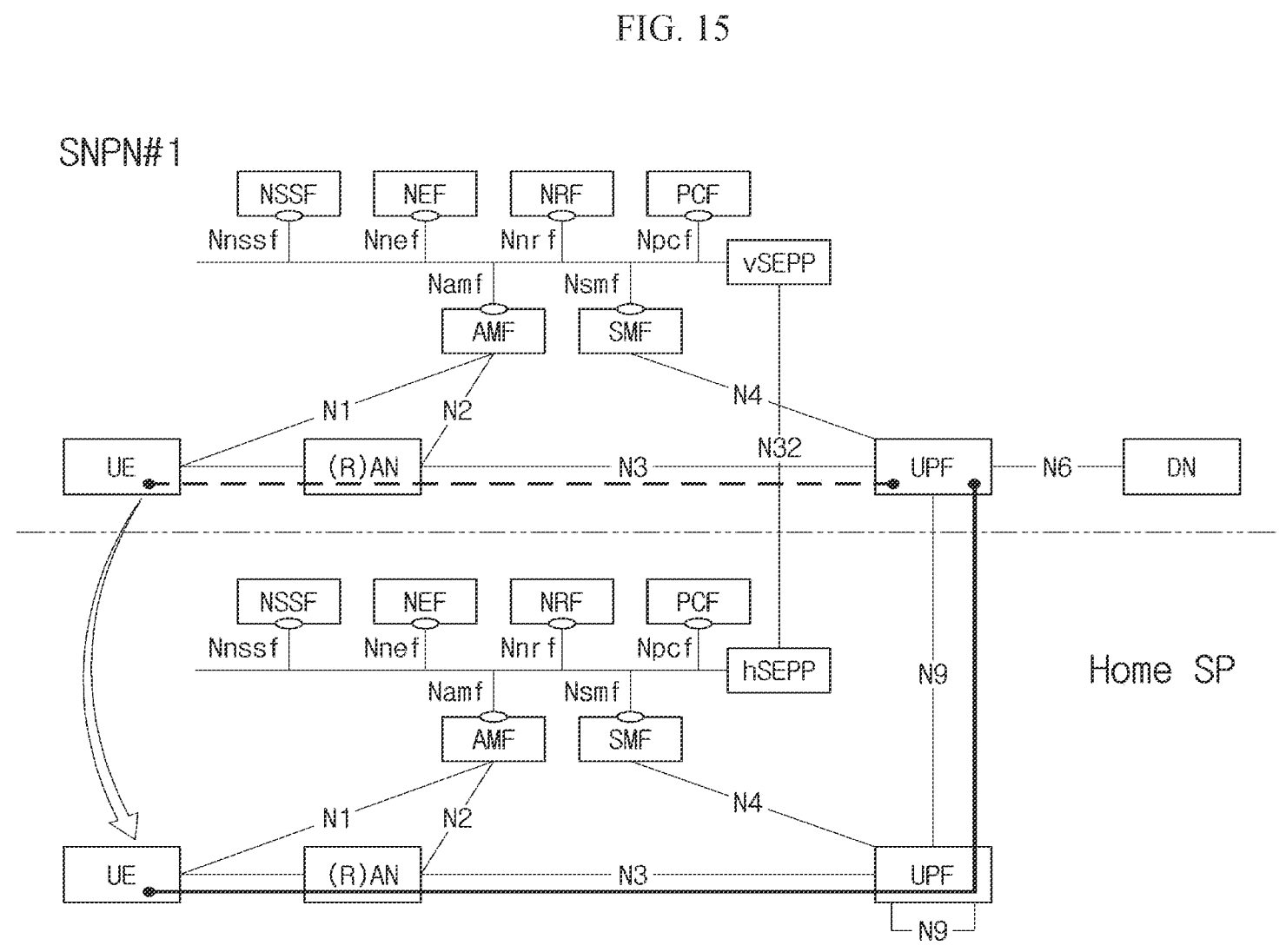

Also, as an example, in the case of FIGS. 12, 13, and 15 described above, the PDU session may be anchored to SNPN #1. At this time, the target network may provide mobility indication information to the UE. For example, the mobility indication may indicate a handover method of a PDU session anchored to SNPN #1 in a process in which the UE performs registration with the target network. In this case, the mobility indication may be performed for each PDU session and may be generated in the AMF based on interworking between the target network and the home service provider. For example, in the case of roaming-like interworking, the mobility indication may be set to "1". In addition, in the case of N3IWF based interworking, the mobility indication may be set to "2". On the other hand, in the case of no interworking support, the mobility indication may be set to "3", but may not be limited thereto. At this time, the UE may perform handover for the PDU session anchored to SNPN #1 after receiving the mobility indication. At this time, the UE may perform a PDU session establishment procedure based on the indicated interworking.

As another example, the source network may provide mobility assistance information. For example, the mobility assistance information may include at least one of an allowed SNPN list or mobility indication information for each candidate target network, but is not limited thereto. The UE may select a target SNPN to perform handover based on the mobility assistance information, and the handover may be performed based on this.

For example, in FIGS. 10 to 15 described above, the Xn interface or N14 interface is not present based on the common AMF between the source network and the target network, but mobility of the UE may be supported based on interworking between two networks among the source network, the target network, and the home service provider.

At this time, for example, in the existing system (e.g. Rel 16), as described above, when a roaming or emergency service is not supported as a SNPN which does not support interworking, handover could be supported only between NG-RANs having the same SNPN ID. Therefore, NG-RAN nodes having different SNPN IDs could not be handover targets as candidate target cells. However, in a new communication system (e.g., Rel 17), handover may be supported even between NG-RAN nodes having different SNPN IDs to support the SNPN.

For example, even when each network supports a different SNPN ID, mutual handover may be supported when each network is connected to the same AMF. In addition, as an example, when an N14 interface is present between networks and a UE may access each network using credentials of the same home service provider, handover may be performed based on an Xn-based handover or NG-based handover procedure, which will be described later.

Considering the foregoing, a UE (e.g., Rel 17 eNPN UE) operating based on a new system needs to operate differently from the handover procedure of the existing system. That is, a handover procedure may be required to support handover between networks having different SNPN IDs, which will be described below.

As a specific example, a handover procedure may be required for a UE to perform handover to an NG-RAN node in a target network having a different SNPN ID as well as an NG-RAN node in a source network having the same SNPN ID. At this time, as an example, the UE accesses a network having a different SNPN ID using credentials of the same home service provider, and an N14 interface between networks having different SNPN IDs may be set or supported only between networks having a common AMF, as described above. At this time, as an example, the N14 interface may be an interface between AMFs. That is, when there is an interface between AMFs connected to each network, the above-described handover may be supported.

As a specific example, a SNPN NG-RAN node may hand over a UE to another SNPN. In this case, the UE may be a UE that supports handover to a network having a different SNPN ID based on a new system. That is, the UE may be handed over from an NG-RAN node in the SNPN as a source network to an NG-RAN node in the SNPN having a different SNPN ID as a target network. For example, based on the foregoing, new service operations between core network functions may be used. For example, an N2 interface may be present between the AMF and the NG-RAN node. At this time, a new N2 message may be defined and used as N2 messages based on the N2 interface. In addition, as an example, a new RRC message may be defined and used as RRC messages between an NG-RAN node and a UE based on the foregoing, and is not limited to the above-described embodiment.

For example, procedures for handover may be performed in FIGS. 16 and 17 below, and the steps may be performed simultaneously or in parallel. Also, the order of the steps may be changed, and is not limited to the above-described embodiment. Also, as an example, in FIGS. 16 and 17 below, indications and parameters are described based on respective names for convenience of description, but may not be limited to the corresponding names. For example, the following names may be replaced with other names based on at least one of other procedures, purposes, and methods.

Figure 16:
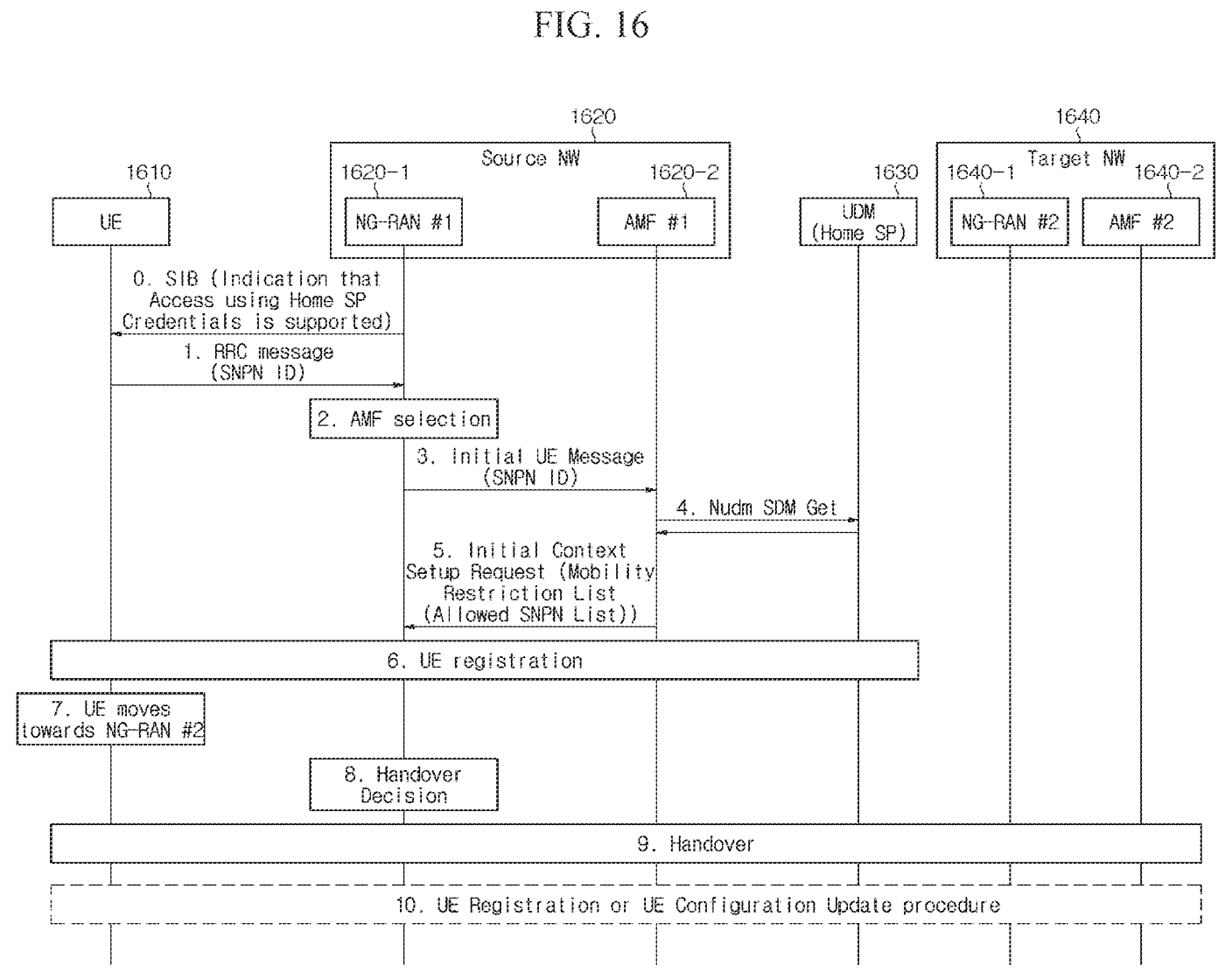

As an example, FIG. 16 is a view illustrating a method of performing handover to a network having a different SNPN ID applied to the present disclosure.

Referring to FIG. 16, an N14 interface is present between a source network 1620 and a target network 1640, and a UE 1610 may access the source network 1620 and the target network 1640 through credentials of the same home service provider. As another example, the AMFs of the source network 1620 and the target network 1640 may be the same. Here, the source network and the target network may be networks having different SNPN IDs. Also, as an example, the UE 1610 may be a UE (e.g., a Rel 17 eNPN UE) of a new system. That is, the UE 1610 may be a UE supporting handover between networks having different SNPN IDs. In addition, as an example, the source network 1620, the target network 1640, and the home service provider 1630 will be all described as being SNPNs below, but are not limited thereto and may be equally applied to the case where they are PLMNs. However, for convenience of description, a description will be given based on the case where the source network 1620, the target network 1640, and the home service provider 1630 are SNPNs. As another example, a case in which the source network 1620, the home service provider 1630, and the target network are different networks will be described below, but is not limited thereto. For example, the source network 1620 and the home service provider 1630 may be the same. As another example, the target network 1640 and the home service provider 1630 may be the same, and are not limited to the above-described embodiment. As another example, since both the source network 1620 and the target network 1640 have a service level agreement (SLA) with the home service provider, N8, N16, N9, and other interfaces may be supported. For example, N8 may be a reference point between UDM and AMF, N9 may be a reference point between UPFs, and N16 may be a reference point between SMFs. Other interfaces may also be supported, but are not limited to a specific form.

The UE 1610 does not store credentials and subscription information of the source network 1620 and the target network 1640 therein, but a preferred SNPN list may be configured to access the source network 1620 and the target network 1620 using credentials of the home service provider, but is not limited to the above-described embodiment.

For example, referring to FIG. 16, NG-RAN #1 1620-1 of the source network 1620 may provide a supportable SNPN ID list to the UE 1610 through a system information block (SIB). At this time, NG-RAN #1 1620 may include, in the SIB, an indicator indicating whether the UE 1610 is capable of accessing the corresponding SNPN using the credentials of the home service provider and provide it to the UE 1610. For example, the indicator may indicate whether a corresponding SNPN supports access through the credentials of the home service provider. For example, the indicator may indicate whether access is supported through the credentials of the home service provider for each SNPN ID included in the SNPN ID list, and through this, the UE 1610 may recognize an accessible SNPN through the credentials of the home service provider. At this time, the UE 1610 does not have credentials and subscription information of the source network 1620, but may access the accessible source network 1620 using the credentials of the home service provider based on the information in the preferred SNPN list. At this time, in order to access the source network 1620, the UE 1610 may include a registration request message in an RRC message and transmit it to the source network 1620 and through this, may start a registration procedure. Also, as an example, the RRC message including the registration request message may include the SNPN ID of the source network selected by the UE. Through this, an AMF 1620-2 supporting the SNPN to which the UE 1610 intends to access may select an NG-RAN 1620-1.

Also, as an example, the UE may notify the AMF of UE capability information through the RRC message including the registration request message. In this case, the UE capability information may be information indicating that the UE supports handover to a network having a different SNPN ID as a new system UE (Rel 17 eNPN supported UE). The AMF 1620-2 may recognize that the UE 1610 may be handed over to another SNPN capable of supporting the credentials of the same home service provider based on the corresponding capability information, and that a handover procedure for this is supported. NG-RAN #1 1620-1, which has received the RRC message including the registration request from the UE 1610, may select an AMF, to which the registration request message will be sent, by considering the SNPN ID of the RRC message. After that, NG-RAN #1 1620-1 may send an initial UE message to AMF #1 (1620-2, and the initial UE message may include a SNPN ID. Through this, AMF #1 1620-2 may perform access control for the UE. After that, AMF #1 1620-2 may determine whether to accept the registration request sent by the UE 1610. At this time, when the UE 1610 is connected using the credentials of the home service provider, AMF #1 1620-2 may receive UE subscriber information from the UDM 1630 located in the home service provider. When AMF #1 1620-2 accepts the registration request of the UE based on the UE subscriber information, AMF #1 1620-2 may transmit an initial context setup request message to request NG-RAN #1 1620-1 to create UE context. In addition, AMF #1 1620-2 may also generate a registration accept message to be sent to the UE 1610 and send it to NG-RAN #1 1620-1 using an initial context setup request message.

At this time, AMF #1 1620-2 may include an allowed SNPN list, which is a list of SNPNs to which the corresponding UE 1610 may be handed over, in a mobility restriction list and send it to NG-RAN #1 1620-1. Through this, NG-RAN #1 1620-1 may recognize that handover of the UE 1610 to the NG-RAN in the SNPN in the allowed SNPN list is possible in addition to handover between the NG-RANs in the source network.

For example, a list of SNPNs to which the corresponding UE 1610 may be handed over may be stored in the subscriber information of the UDM 1630 in the home service provider. Also, as an example, AMF #1 1620-2 may recognize that the presence/absence of an N14 interface with a neighboring AMF, whether there is an SLA or not, and other information are pre-configured. Accordingly, AMF #1 1620-2 may generate an allowed SNPN list for the UE using the corresponding information and send it to the NG-RAN. After that, the AMF #1 1620-2 may perform UE policy association establishment through a PCF and complete registration of the UE 1610 based on a registration completion message. AMF #1 1620-2 may check UE registration with the UDM 1630 and provide authentication and authority to the UE. Based on the foregoing, the UE 1610 may be registered with NG-RAN #1 1620-1 of the source network 1620. After that, the UE may move toward NG-RAN #2 1640-1. In this case, NG-RAN #2 may be the NG-RAN of the target network 1640. More specifically, the UE 1610 may perform measurement and report the measurement result to NG-RAN #1 1620-1. At this time, NG-RAN #1 1620-1 may determine whether or not to perform handover based on the measurement result reported by the UE 1610. That is, whether to perform handover of the UE 1610 may be determined based on the measurement of the UE 1610. At this time, the candidate target NG-RAN nodes to which the UE 1610 may be handed over include not only the NG-RAN node in the source network 1620 but also NG-RAN node of other SNPN ID based on the above-described allowed SNPN list information.

For example, when the target NG-RAN node supports a plurality of SNPN IDs, NG-RAN #1 1620-1 may arbitrarily select one SNPN ID from the allowed SNPN list. As another example, NG-RAN #1 1620-1 may determine a target SNPN from the allowed SNPN list based on pre-configured information. After that, NG-RAN #1 1620-1 may determine a target node, to which the UE 1610 is handed over, from among candidate target nodes. For example, NG-RAN #1 1620-1 may determine to hand over the UE 1610 to an NG-RAN node in the target network 1640. That is, the UE 1610 may be determined to be handed over from NR-RAN #1 1620-1 in the source network 1620 to NG-RAN #2 1640-1 in the target network 1640 based on the allowed SNPN list. At this time, a procedure for handing over the UE 1610 to the NG-RAN #2 1640-1 of the target network 1640 may be performed according to the above-described determination.

At this time, as an example, the handover of the UE 1610 may be performed through an Xn-based handover procedure. That is, the handover of the UE 1610 may be performed based on the Xn interface. At this time, NG-RAN #1 1620-1 may send a handover request message to NG-RAN #2 1640-1. In this case, the handover request message may include a target SNPN ID. NG-RAN #2 1640-1 may perform access control for the corresponding UE 1610 by referring to the target SNPN ID and the allowed SNPN list in the mobility restriction list. Then, when NG-RAN #2 1640-1 accepts the handover of the UE 1610, NG-RAN #2 1640-1 may send a handover request acknowledge message to NG-RAN #1 1620-1. At this time, NG-RAN #1 1620-1 may send an RRC message (i.e., Handover Command) including the handover request acknowledge message to the UE 1610. Through this, the UE 1610 may recognize the SNPN ID served through NG-RAN #2 1640-1. In addition, as an example, the NG-RAN #2 1640-1 may send, to AMF #2 1640-2 of the target network 1640, information indicating that the UE 1610 has been handed over through a path switch procedure and the serving SNPN ID for the UE 1610 has been changed.

As another example, the handover of the corresponding UE 1610 may be performed based on an NG-based handover procedure. More specifically, NG-RAN #1 1620-1 may perform an NG-based handover procedure by sending a handover required message to AMF #1 1620-2. At this time, NG-RAN #1 1620-1 may include the selected target SNPN ID in the handover required message and send it to AMF #1 1620-2. At this time, when an N14 interface is present between AMF #1 1620-2 and AMF #2 1640-2, AMF #1 1620-2 may transmit a "Namf_Communication_CreateUE-Context Request" message to AMF #2 1640-2 to indicate that handover is necessary. At this time, AMF #2 1640-2 may request the handover of the corresponding UE 1610 by transmitting a handover request message. For example, AMF #2 1640-2 may generate an allowed SNPN list based on the situation of NG-RAN #2 1640-1 and transmit it to NG-RAN #2 1640-1. In addition, AMF #2 1640-2 may update the serving SNPN ID to the target network and include the updated mobility restriction list in the handover request message and sends it to NG-RAN #2 1640-1 together.

After that, NG-RAN #2 1640-1 may perform access control for the corresponding UE. When NG-RAN #2 1640-1 accepts the handover of the UE, NG-RAN #2 1640-1 may respond to NG-RAN #1 1640-1 through a handover request acknowledge message. In this case, the handover request acknowledge message may include an RRC message (i.e., Handover Command) to be sent to the UE 1610 through NG-RAN #1 1620-1. The UE 1610 may receive the RRC message from NG-RAN #1 1620-1 and check the SNPN ID served by the NG-RAN #2 1640-1 through this.

As another example, the UE may obtain SNPN ID information of NG-RAN #2 1640-1 through a NAS message instead of an RRC message, and is not limited to a specific embodiment. In addition, as an example, when an N14 interface is present between the source network 1620 and the target network 1640, AMF #2 1640-2 may send a new serving SNPN ID of NG-RAN #2 1640-1 to the UE 1610 during the mobility registration procedure after performing the NG-based handover procedure and is not limited to the above-described embodiment.

As another example, when the source network 1620 and the target network 1640 operate based on the same AMF, AMF #2 1640-2 may perform a UE configuration update procedure after terminating NG-based handover and send a new serving SNPN ID, and is not limited to the above-described embodiment.

Based on the foregoing, the NG-RAN of the source network may support not only handover of the UE in the source network, but also handover to the SNPN in the allowed SNPN list. Through this, when the UE uses the credentials of the home service provider, the UE may receive a service by continuously using the existing PDU session without an additional process for creating a new PDU session.

Figure 17:
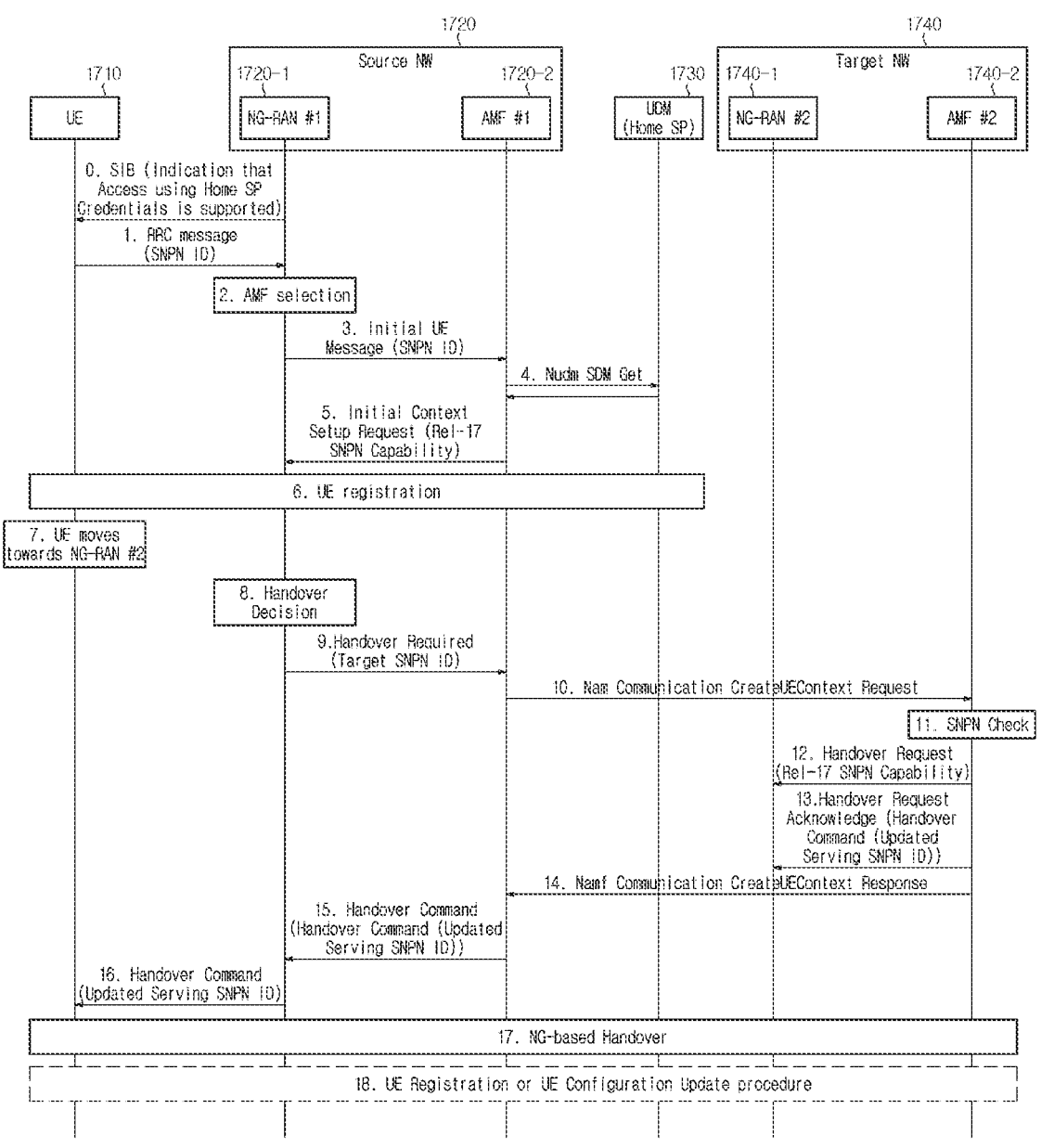
FIG. 17 is a view illustrating procedures for handover applicable to the present disclosure.

FIG. 17 is a view illustrating a method of handing over a UE applied to the present disclosure to a network having a different SNPN ID. For example, referring to FIG. 17, an N14 interface is present between a source network 1720 and a target network 1740, and a UE 1710 may access the source network 1720 and the target network 1740 through credentials of the same home service provider. As another example, the AMFs of the source network 1720 and the target network 1740 may be the same. Here, the source network 1720 and the target network 1740 may have different SNPN IDs. Also, as an example, the UE 1710 may be a UE of a new system (e.g., a Rel 17 eNPN UE). That is, the UE 1710 may be a UE supporting handover between networks having different SNPN IDs. Also, as an example, the source network 1720, the target network 1740, and the home service provider 1730 are described as being all SNPNs, but are not limited thereto and may be equally applied to the case where they are PLMNs. However, for convenience of description, the case where the source network 1720, the target network 1740, and the home service provider 1730 are SNPNs will be described below. As another example, a case in which the source network 1720, the home service provider 1730, and the target network are different networks will be described below, but is not limited thereto. For example, the source network 1720 and the home service provider 1730 may be the same. As another example, the target network 1740 and the home service provider 1730 may be the same, and are not limited to the above-described embodiment. As another example, since both the source network 1720 and the target network 1740 have a service level agreement (SLA) with the home service provider, N8, N16, N9, and other interfaces may be supported. For example, N8 may be a reference point between UDM and AMF, N9 may be a reference point between UPFs, N16 may be a reference point between SMFs, and the other interfaces may also be supported, but are not limited to a specific form.

Also, as an example, a preferred SNPN list may be configured, such that the UE 1710 does not store credentials and subscription for the source network 1720 and the target network 1740 therein, but accesses the source network 1720 and the target network 1740 using credentials of the home service provider, but is not limited to the above-described embodiment.

For example, referring to FIG. 17, NG-RAN #1 1720-1 of the source network 1720 may provide a supportable SNPN ID list to the UE 1710 through a system information block (SIB). At this time, NG-RAN #1 1720-1 may include, in the SIB, an indicator indicating whether the UE 1710 may access the corresponding SNPN in the SIB using the credential of the home service provider and provide it to the UE 1710. For example, the indicator may indicate whether the corresponding SNPN supports access through the credentials of the home service provider. For example, the indicator may indicate whether access is supported through the credentials of the home service provider for each SNPN ID included in the SNPN ID list, and through this, the UE 1710 may recognize the SNPN accessible through the credentials of the home service provider. At this time, the UE 1710 does not have credentials and subscription information of the source network 1720, but may access the accessible source network 1720 using the credentials of the home service provider based on the information in the preferred SNPN list. At this time, in order to access the source network 1720, the UE 1710 may include a registration request message in an RRC message and transmit it to the source network 1720, and through this, may start a registration procedure. Also, as an example, the RRC message including the registration request message may include a SNPN ID selected by the UE. Through this, the AMF 1720-2 supporting the SNPN to which the UE 1710 intends to access may select the NG-RAN 1720-1.

Also, as an example, the UE may notify the AMF of UE capability information through the RRC message including the registration request message. In this case, the UE capability information may be information indicating that the UE supports handover to a network having a different SNPN ID as a new system UE (Rel 17 eNPN supported UE). AMF #1 1720-2 may recognize that the UE 1710 may be handed over to another SNPN that can support credentials of the same home service provider based on the corresponding capability information, and recognize that the handover procedure for this is supported. NG-RAN #1 1720-1, which has received the RRC message including the registration request from the UE 1710, may select AMF #1 1720-2, to which the registration request message will be sent, by considering the SNPN ID of the RRC message. After that, NG-RAN #1 1720-1 may send an initial UE message to AMF #1 1720-2, and the initial UE message may include a SNPN ID. Through this, AMF #1 1720-2 may perform access control for the UE. After that, AMF #1 1720-2 may determine whether to accept the registration request sent by the UE 1710. At this time, when the UE 1710 is connected using the credentials of the home service provider, AMF #1 1720-2 may receive UE subscriber information from a UDM 1730 located in the home service provider. When AMF #1 1720-2 accepts the registration request of the UE based on the UE subscriber information, AMF #1 1720-2 may transmit an initial context setup request message to the NG-RAN #1 1720-1 to request NG-RAN #1 1720-1 to create UE context. In addition, AMF #1 1720-2 may also generate a registration accept message to be sent to the UE 1710 and send it to NG-RAN #1 1720-1 using the initial context setup request message.

In addition, AMF #1 1720-2 may indicate, to NG-RAN #1 1720-1, that the corresponding UE has SNPN capability (e.g., Rel-17 SNPN capability) of the new system. That is, the SNPN capability information of the UE based on the new system may be included in the initial context setup request message and sent to NG-RAN #1 1720-1. As an example, AMF #1 1720-2 only provides NG-RAN #1 1720-1 with information indicating that the UE is capable of being handed over to a SNPN having a different SNPN ID, and may not provide allowed SNPN list information as shown in FIG. 16. Through this, NG-RAN #1 1720-1 may recognize that NG-based handover of the UE 1710 to a network having an SNPN ID other than the source network 1720 is possible. However, candidate target nodes to which the UE 1710 may be handed over may not be limited to the allowed SNPN list. Therefore, NG-RAN #1 1720-1 may determine not only a node having the same SNPN ID but also an arbitrary NG-RAN as a target node in the process of determining the handover of the UE. At this time, as an example, when the UE 1710 is handed over to another NG-RAN in the source network 1720, a conventional Xn-based handover procedure or an NG-based handover procedure may be used as the handover procedure, and is not limited to the above-described embodiment.

After that, the AMF #1 1720-2 may perform UE policy association establishment through a PCF and complete registration of the UE 1710 based on a registration completion message. After that, AMF #1 1720-2 may confirm UE registration with the UDM 1730, and provide authentication and authority to the UE. Based on the foregoing, the UE 1710 may be registered with NG-RAN #1 1720-1 of the source network 1720. After that, the UE may move toward NG-RAN #2 1740-2. In this case, NG-RAN #2 may be the NG-RAN of the target network 1740.

More specifically, the UE 1710 may perform measurement and report the measurement result to NG-RAN #1 1720-1. At this time, NG-RAN #1 1720-1 may determine whether or not to perform handover based on the measurement result reported by the UE 1710. That is, whether to perform handover of the UE 1710 may be determined based on the measurement of the UE 1710. At this time, the target NG-RAN node to which the UE 1710 is handed over may consider not only the NG-RAN node in the source network 1720 but also the NG-RAN nodes in the network having different SNPN IDs as a candidate node.

For example, when a target NG-RAN node supports a plurality of SNPN IDs, NG-RAN #1 1720-1 may arbitrarily select one SNPN ID. As another example, NG-RAN #1 1720-1 may determine a target SNPN based on pre-configured information. Then, as an example, NG-RAN #1 1720-1 may determine that the UE 1610 is handed over to an NG-RAN node in the target network 1740. That is, the UE 1710 may be determined to be handed over from NR-RAN #1 1720-1 in the source network 1720 to NG-RAN #2 1740-1 in the target network 1740. At this time, a procedure for handover of the UE 1710 to NG-RAN #2 1740-1 of the target network 1640 may be performed according to the above-described determination.

For example, upon determining that handover to NG-RAN #2 1740-1 of the target network 1740 is necessary in consideration of radio quality based on the measurement result of the UE 1710, the NG-RAN #1 1720-1 may perform an NG-based handover procedure by transmitting a handover required message to AMF #1 1720-2. At this time, NG-RAN #1 1720-1 may include the SNPN ID of the target network 1740 in the handover required message and transmit it based on the foregoing.

Then, based on the NG-based handover procedure, AMF #1 1720-2 may transmit an AMF communication terminal context request (Namf_Communication_CreateUEContext Request) message to AMF #2 1740-2 of the target network 1740 to inform that handover of the UE 1710 is necessary. At this time, for example, when the AMF of the source network 1720 and the AMF of the target network 1740 are the same, the above-described procedure may be omitted. That is, when AMF #1 1720-2 and AMF #2 1740-2 are the same, AMF communication UE context request message transmission may be omitted. Thereafter, AMF #2 1740-2 may determine whether the UE 1710 may access the target network 1740 using credentials of the home service provider. For example, when the corresponding UE 1710 cannot access the target network 1740 using the credentials of the home service provider, AMF #2 1740-2 may notify AMF #1 1720-2 that the handover of the corresponding UE 1710 has been rejected along with the reason. At this time, AMF #1 1720-2 may notify NG-RAN #1 1720-1 that handover of the UE 1710 to the target SNPN has been rejected along with the reason through a handover preparation failure message. Therefore, the NG-RAN #1 1720-1 may perform a handover procedure by reselecting a target SNPN ID from a SNPN ID list capable of supporting handover as a target node. As another example, AMF #1 1720-1 may directly determine whether or not a connection to the target network 1740 is possible based on at least one of information included in a handover request, information received from the UDM of the home service provider, or information configured in AMF #1 1720-1, but is not limited to the above-described embodiment.

For example, when the UE 1710 may access the target network 1740 using the credentials of the home service provider based on whether to connect to the target network 1740, AMF #2 1740-2 may transmit a handover request message to NG-RAN #2 1740-1 to request handover of the UE 1710. At this time, as an example, when AMF #2 1740-2 transmits a handover request message to NG-RAN #2 1740-1, AMF #2 1740-2 may notify that the UE 1710 has SNPN capability (e.g. Rel-17 SNPN capability) of the new system.

That is, AMF #2 1740-2 may include capability information indicating that the UE 1710 is capable of being handed over to a network with a different SNPN ID and transmit it to NG-RAN #2 1740-2. Through this, NG-RAN #2 may later recognize that NG-based handover of the UE 1710 to a network having a different SNPN ID rather than the target network 1740 is supported.

In addition, as an example, AMF #2 1740-2 may update a serving SNPN ID to the target network 1740, include a mobility restriction list in the handover request message based on this and transmit it to NG-RAN #2 1740-1. At this time, NG-RAN #2 1740-1 may perform access control for the UE 1710. When UE 1710 may accept handover, NG-RAN #2 1740-1 may send a handover request acknowledge message to AMF #2 1740-2. In this case, the handover request acknowledge may include an RRC message (e.g., Handover Command) to be sent to the UE through NG-RAN #1 1720-1. As an example here, when the serving SNPN ID included in the mobility restriction list may not be supported, AMF #2 1740-2 may reject handover of the corresponding UE 1710. On the other hand, if the serving SNPN ID included in the mobility restriction list may be supported, AMF #2 1740-2 may transmit an AMF communication creation terminal context response (Namf_Communication_CreateUEContext Response) message to AMF #1 1720-2 to indicate the handover result of the UE 1710. After that, AMF #1 1720-2 may transmit a handover command message to NG-RAN #1 1720-1, through which NG-RAN #1 1720 may recognize that NG-RAN #2 1740 has accepted handover In addition, as an example, the serving SNPN ID updated as information sent by NG-RAN #2 1740-1 through AMF #2 1740-2 may also be sent to NG-RAN #1 1720-1.

After that, NG-RAN #1 1720-1 may send, to the UE, an RRC message (e.g., handover command) included in the handover command message received from NG-RAN #2 1740-1. Then, the UE 1710 may perform an NG-based handover procedure.

In addition, as an example, although the RRC message was used to send the SNPN ID to be used through the NG-RAN #2 1740-1 to the UE 1710 as described above, a NAS message may be used, and is not limited to a specific embodiment.

In addition, as an example, when an N14 interface is present between the source network 1720 and the target network 1740, AMF #2 1740-2 may send a serving SNPN ID to the UE 1710 during the mobility registration procedure performed after performing the NG-based handover procedure. As another example, when the AMFs of the source network 1720 and the target network 1740 are the same, AMF #2 1740-2 may send a serving SNPN ID to the UE 1710 through a UE configuration update procedure after completing NG-based handover, and is not limited to a specific embodiment.

Figure 18:
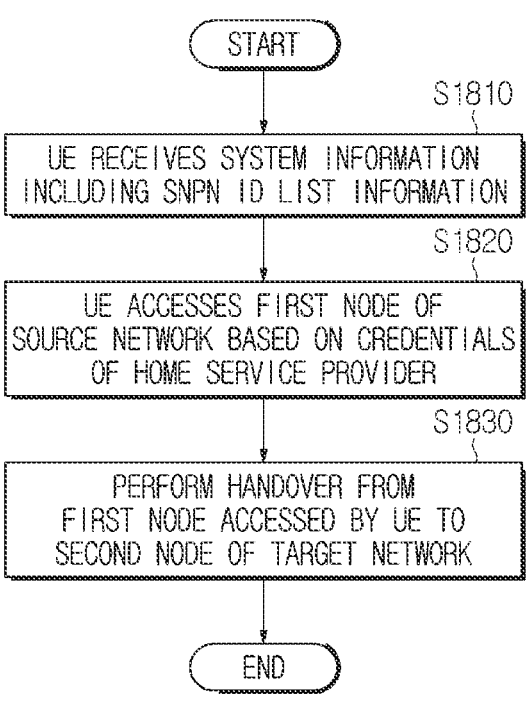
FIG. 18 is a flowchart illustrating an operation method applied to the present disclosure.

FIG. 18 is a flowchart illustrating an operation method applied to the present disclosure.

Referring to FIG. 18, a UE may receive system information including SNPN ID list information (S1810). In this case, as described above with reference to FIGS. 16 and 17, the system information may include information indicating that the UE may access a first node of a source network through credentials of a home service provider. Thereafter, the UE may access the first node of the source network based on credentials of the home service provider (S1820). At this time, the first node may be NG-RAN #1 of the above-described source network, but is not limited thereto. Thereafter, the UE may be handed over from the accessed first node to a second node of a target network (S1830). At this time, the second node may be NG-RAN #2 of the above-described target network, but is limited thereto.

At this time, for example, when the UE accesses the first node, the UE may transmit an RRC message to the first node for registration. At this time, the RRC message may include the SNPN ID of the source network selected by the UE. Also, as an example, the RRC message may further include SNPN access capability information of the UE, as described above. Then, the first node may select a first AMF based on the SNPN ID in the RRC message and transmit an initial UE message including the SNPN ID. In this case, when the first AMF allows registration of the UE, an initial context setup request message may be received from the first AMF.

In this case, as an example, as shown in FIG. 16 described above, the initial context setup request message may include information on a list of allowed SNPNs to which the UE may be handed over.

At this time, the UE may perform measurement and may be handed over from the first node to another node based on the measurement result. For example, candidate nodes to which the UE may be handed over may be other nodes in the source network and nodes having SNPN IDs of SNPNs included in the allowed SNPN list. In this case, when the UE is handed over based on the first node, the UE may be handed over to any one of the above-described candidate nodes, as shown in FIG. 16.

As another example, the UE may determine a target network based on pre-configured information and allowed SNPN list information through the first node, and may be handed over to a target within the target network. When the UE is handed over based on the foregoing, the UE may be handed over to a target node in the target network based on any one of Xn-based handover or NG-based handover.

As an example, a case in which the UE is handed over to the target node in the target network through Xn-based handover may be considered. At this time, the first node may transmit a handover request message including the target SNPN ID to the target node in the target network. The target node may perform access control for the corresponding UE based on the allowed SNPN list in the mobility restriction list. In this case, when the target UE accepts the handover of the UE, the target node in the target network may send updated serving SNPN ID information to the first node. After that, the UE may obtain updated serving SNPN ID information through an RRC message from the first node. Also, as an example, the target node may indicate that the serving SNPN ID for the UE has been changed to a second AMF corresponding to the target node.

As another example, a case in which a UE is handed over to the target node in the target network through NG-based handover may be considered. In this case, the first AMF may transmit a handover required message including the target SNPN ID to a second AMF corresponding to the target node of the target network. The second AMF may transmit a handover request message to the target node of the target network, receive a response, and obtain updated serving SNPN ID information. Then, the second AMF may send the updated serving SNPN ID to the first node through the first AMF. Thereafter, the UE may receive a handover command message including the updated serving SNPN ID from the first node through an RRC message.

As another example, the above-described initial context setup request message may include information indicating the SNPN capability of the UE. That is, only capability information indicating that the UE may be handed over to a network having a different SNPN ID may be included in the initial context setup request message. In this case, when the UE is handed over from the first node to another node based on the measurement result, the UE may be handed over from the first node to an arbitrary target node. That is, since the allowed SNPN ID list is not indicated as described above and only the SNPN capability information is indicated, the UE may be handed over to an arbitrary node and may not be limited to a specific list. At this time, the first node may transmit a handover required message to the first AMF. For example, the handover required message includes SNPN ID information of the target network including the target node, and the first AMF may transmit the handover request message to the second AMF of the target network based on the SNPN ID of the target network. After that, the second AMF may check whether the UE may access the target network through credentials of the home service provider. At this time, if the UE may access the target network through the credentials of the home service provider, the second AMF may transmit a handover request message including the SNPN capability information of the UE to the target node of the target network, receive a response, and obtain updated serving SNPN ID information. At this time, the updated serving SNPN ID may be sent to the first node through the first AMF. Then, the first node may transmit a handover command message including the updated serving SNPN ID to the UE, and the UE may be handed over.

At this time, as an example, in order to support handover to a network having a different SNPN ID as described above, the UE needs to be able to access the source network and the target network through the credentials of the home service provider. In addition, when the AMFs of the source network and the target network are the same or an N14 interface is present between the source network and the target network, handover to a network having a different SNPN ID may be supported, as described above.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The invention claimed is:

1. A method comprising:
   receiving, by a user equipment (UE), system information from a first node,
   wherein the system information includes i) a list of standalone non-public network (SNPN) identity (ID)

information, and ii) information related to whether access using credentials from a credentials holder is supported;

transmitting, by the UE, a registration request message in a radio resource control (RRC) message to the first node, wherein the RRC message includes SNPN ID information related to the source network, and wherein the registration request message includes SNPN capability information related to the UE supporting a handover to a target network having a different SNPN ID from the source network; and based on i) the UE being capable of accessing the source network and the target network based on the credentials from the credentials holder, and ii) an N14 interface being present between the source network and the target network, performing, by the UE, the handover from the first node to a second node in the target network having the different SNPN ID from the source network, wherein the second node in the target network is determined based on the SNPN capability information.

2. The method of claim 1, wherein the first node selects a first access and mobility management function (AMF) based on the SNPN ID information related to the source network and transmits an initial UE message including the SNPN ID information related to the source network to the first AME, and receives an initial context setup request message from the first AMF based on the first AMF allowing registration of the UE.

3. The method of claim 2, wherein the initial context setup request message comprises a list of allowed SNPNs to which the UE is capable of being handed over.

4. The method of claim 3,
   wherein candidate nodes to which the UE is capable of being handed over are set to other nodes in the source network and nodes having SNPN IDs of SNPNs included in the list of allowed SNPNs, and
   wherein the UE is handed over to any one of the candidate nodes.

5. The method of claim 4, wherein the target network is determined based on information pre-configured through the first node and the list of allowed SNPNs.

6. The method of claim 5, wherein the UE is handed over to the second node in the target network based on any one of Xn-based handover or NG-based handover.

7. The method of claim 6, wherein, based on the UE being handed over to the second node in the target network through the Xn-based handover and the second node in the target network accepting handover the UE, the second node in the target network provides updated serving SNPN ID information to the UE through the first node.

8. The method of claim 6,
   wherein, based on the UE being handed over to the second node in the target network through the NG-based handover, the first AMF transmits a handover required message to a second AMF corresponding to the second node in the target network,
   wherein the second AMF transmits a handover request message to the second node in the target network, obtains updated serving SNPN ID information, and sends the updated serving SNPN ID information to the first node through the first AMF, and
   wherein the UE receives a handover command message including the updated serving SNPN ID information from the first node.

9. The method of claim 2, wherein the initial context setup request message comprises the SNPN capability information.

10. The method of claim 9, wherein the UE is handed over from the first node to an arbitrary target node, based on the UE being handed over from the first node to another node based on a measurement result, and wherein the first node transmits a handover required message to the first AMF, based on the handover of the UE being necessary based on the measurement result.

11. The method of claim 10, wherein the handover required message comprises SNPN ID information related to the target network, wherein the first AMF transmits a handover request message to a second AMF in the target network based on the SNPN ID information related to the target network, and wherein the second AMF checks whether the UE is capable of accessing the target network based on the credentials from the credentials holder.

12. The method of claim 11, wherein, based on the UE being capable of accessing the target network based on the credentials from the credentials holder, the second AMF transmits a handover request message including the SNPN capability information to the second node in the target network, and obtains updated serving SNPN ID information, and wherein the updated serving SNPN ID information is sent to the first node through the first AMF.

13. The method of claim 12, wherein the UE receives a handover command message including the updated serving SNPN ID information from the first node.

14. A user equipment (UE) UE comprising:

at least one processor; and at least one memory operably connected to the at least one processor and storing instructions, based on being executed by the at least one processor, cause the UE to perform operations comprising, receiving system information from a first node, wherein the system information includes i) a list of standalone non-public network (SNPN) identity (ID) information, and ii) information related to whether access using credentials from a credentials holder is supported;

transmitting a registration request message in a radio resource control (RRC) message to the first node, wherein the RRC message includes SNPN ID information related to the source network, and wherein the registration request message includes SNPN capability information related to the UE supporting a handover to a target network having a different SNPN ID from the source network; and based on i) the UE being capable of accessing the source network and the target network based on the credentials from the credentials holder, and ii) an N14 interface being present between the source network and the target network, performing the handover from the first node accessed to a second node in the target network having the different SNPN ID from the source network, wherein the second node in the target network is determined based on the SNPN capability information.

15. A first node comprising:

at least one processor; and at least one memory operably connected to the at least one processor and storing instructions, based on being executed by the at least one processor, cause the first node to perform operations comprising, transmitting system information to a user equipment (UE), wherein the system information includes i) a list of standalone non-public network (SNPN) identity (ID) information, and ii) information related to whether access using credentials from a credentials holder is supported;

receiving a registration request message in a radio resource control (RRC) message from the UE, wherein the RRC message includes SNPN ID information related to a source network, and wherein the registration request message includes SNPN capability information related to the UE supporting a handover to a target network having a different SNPN ID from the source network; and based on i) the UE being capable of accessing the source network and the target network based on the credentials from the credentials holder, and ii) an N14 interface being present between the source network and the target network, handing over the UE to a second node in the target network having the different SNPN ID from the source network, wherein the second node in the target network is determined based on the SNPN capability information.

* * * * *